(12) United States Patent
Braedt

(10) Patent No.: US 11,260,938 B2
(45) Date of Patent: Mar. 1, 2022

(54) REAR WHEEL SPROCKET ARRANGEMENT

(71) Applicant: SRAM DEUTSCHLAND GmbH, Schweinfurt (DE)

(72) Inventor: Henrik Braedt, Hambach (DE)

(73) Assignee: SRAM Deutschland GmbH, Schweinfurt (DE)

( * ) Notice: Subject to any disclaimer, the term of this patent is extended or adjusted under 35 U.S.C. 154(b) by 316 days.

(21) Appl. No.: 16/289,111

(22) Filed: Feb. 28, 2019

(65) Prior Publication Data

US 2019/0263473 A1  Aug. 29, 2019

(30) Foreign Application Priority Data

Feb. 28, 2018 (DE) ..................... 10 2018 203 023.5
Dec. 21, 2018 (DE) ..................... 10 2018 133 324.2

(51) Int. Cl.
*B62M 9/10* (2006.01)
*F16H 55/30* (2006.01)

(52) U.S. Cl.
CPC .............. *B62M 9/10* (2013.01); *F16H 55/30* (2013.01)

(58) Field of Classification Search
CPC .......... B62M 9/10; B62M 9/105; F16H 55/30
USPC ........................................................ 474/160
See application file for complete search history.

(56) References Cited

U.S. PATENT DOCUMENTS

| | | | | |
|---|---|---|---|---|
| 4,174,642 A | * | 11/1979 | Martin | F16H 55/30 474/152 |
| 4,380,445 A | * | 4/1983 | Shimano | B62M 9/105 474/144 |
| 5,503,598 A | * | 4/1996 | Neuer | B62M 9/10 474/160 |
| 5,954,604 A | * | 9/1999 | Nakamura | F16G 13/06 474/160 |
| 6,409,281 B1 | * | 6/2002 | Kanehisa | B60B 27/026 301/110.5 |
| 6,454,671 B1 | * | 9/2002 | Wickliffe | B62M 9/1342 474/80 |
| 6,572,500 B2 | * | 6/2003 | Tetsuka | B62M 9/10 474/160 |
| 7,325,391 B1 | * | 2/2008 | Oishi | F16G 13/06 59/5 |

(Continued)

FOREIGN PATENT DOCUMENTS

| | | |
|---|---|---|
| DE | 102015205736 | 10/2016 |
| EP | 0765802 | 4/1997 |

*Primary Examiner* — Henry Y Liu

(57) ABSTRACT

A bicycle rear wheel sprocket arrangement which is rotatable about a common sprocket rotation axis that defines an axial direction and orthogonal to which are radial directions, comprising a plurality of sprockets of different sizes and number of teeth arranged coaxially along the sprocket rotation axis, which are connected to one another such that the sprockets jointly rotate about the sprocket rotation axis together, wherein the sprocket arrangement comprises a first partial arrangement that includes a largest sprocket, and a second partial arrangement that includes a plurality of sprockets formed integrally with one another. One partial arrangement has a plurality of elastically deformable latching formations that are in latching engagement with a plurality of mating latching formations of the other partial arrangement to prevent the two partial arrangements from separating in the axial direction.

10 Claims, 18 Drawing Sheets

(56) References Cited

U.S. PATENT DOCUMENTS

| | | | | |
|---|---|---|---|---|
| 7,669,871 B2* | 3/2010 | Watarai | B62K 25/02 | |
| | | | 280/279 | |
| 7,854,673 B2* | 12/2010 | Oseto | B62M 9/10 | |
| | | | 474/82 | |
| 7,871,347 B2* | 1/2011 | Kamada | B62M 9/10 | |
| | | | 474/160 | |
| 8,092,329 B2* | 1/2012 | Wickliffe | F16H 55/303 | |
| | | | 474/160 | |
| 8,911,314 B2* | 12/2014 | Braedt | B62M 9/10 | |
| | | | 474/160 | |
| 9,182,027 B2* | 11/2015 | Reiter | F16H 55/30 | |
| 9,316,302 B2* | 4/2016 | Braedt | F16H 55/30 | |
| 9,873,481 B2* | 1/2018 | Braedt | B62M 9/121 | |
| 10,053,186 B2* | 8/2018 | Braedt | F16H 55/30 | |
| 10,378,637 B2* | 8/2019 | Ooishi | F16H 55/30 | |
| 10,703,441 B2* | 7/2020 | Dos Santos | B62M 9/126 | |
| 2002/0070604 A1* | 6/2002 | Kanehisa | B60B 27/026 | |
| | | | 301/110.5 | |
| 2002/0086753 A1* | 7/2002 | Yahata | B62M 9/105 | |
| | | | 474/160 | |
| 2004/0142782 A1* | 7/2004 | Kamada | B60B 27/026 | |
| | | | 474/160 | |
| 2005/0176537 A1* | 8/2005 | Matsumoto | B62M 9/121 | |
| | | | 474/80 | |
| 2005/0282671 A1* | 12/2005 | Emura | B62M 9/105 | |
| | | | 474/160 | |
| 2006/0172840 A1* | 8/2006 | Kamada | B62M 9/10 | |
| | | | 474/152 | |
| 2006/0205549 A1* | 9/2006 | Nonoshita | B62M 9/105 | |
| | | | 474/160 | |
| 2006/0258498 A1* | 11/2006 | Tabe | B62M 9/105 | |
| | | | 474/160 | |
| 2008/0231014 A1* | 9/2008 | Braedt | B62M 9/10 | |
| | | | 280/260 | |
| 2011/0079103 A1* | 4/2011 | Kususe | B62K 23/06 | |
| | | | 74/502.2 | |
| 2011/0092327 A1* | 4/2011 | Oishi | B62M 9/10 | |
| | | | 474/160 | |
| 2011/0105263 A1* | 5/2011 | Braedt | B62M 9/10 | |
| | | | 474/160 | |
| 2012/0225745 A1* | 9/2012 | Oishi | B62M 9/125 | |
| | | | 474/160 | |
| 2013/0017914 A1* | 1/2013 | Braedt | F16D 1/108 | |
| | | | 474/160 | |
| 2013/0109519 A1* | 5/2013 | Morita | F16H 55/30 | |
| | | | 474/148 | |
| 2013/0139642 A1* | 6/2013 | Reiter | B62M 9/105 | |
| | | | 74/594.2 | |
| 2013/0184115 A1* | 7/2013 | Urabe | F16H 37/022 | |
| | | | 475/193 | |
| 2014/0179474 A1* | 6/2014 | Florczyk | F16H 55/30 | |
| | | | 474/160 | |
| 2014/0335987 A1* | 11/2014 | Iwai | F16H 55/303 | |
| | | | 474/161 | |
| 2015/0080160 A1* | 3/2015 | Staples | B62M 9/12 | |
| | | | 474/160 | |
| 2016/0101825 A1* | 4/2016 | Braedt | B62M 9/121 | |
| | | | 474/160 | |
| 2016/0272002 A1* | 9/2016 | Earle | B21D 53/28 | |
| 2016/0280326 A1* | 9/2016 | Braedt | F16H 55/30 | |
| 2016/0362159 A1* | 12/2016 | Braedt | B62M 9/10 | |
| 2017/0057598 A1* | 3/2017 | Thrash | B62M 9/10 | |
| 2017/0067536 A1* | 3/2017 | Dos Santos | F16G 13/06 | |
| 2017/0146109 A1* | 5/2017 | Reiter | B62M 9/00 | |
| 2017/0217539 A1* | 8/2017 | Braedt | B62M 9/10 | |
| 2017/0361901 A1* | 12/2017 | Tokuyama | F16H 55/30 | |
| 2018/0105229 A1* | 4/2018 | Reinbold | B62M 9/122 | |
| 2018/0194433 A1* | 7/2018 | Dos Santos | F16G 13/06 | |
| 2018/0202531 A1* | 7/2018 | Ooishi | F16H 55/30 | |
| 2019/0031288 A1* | 1/2019 | Kamada | F16H 55/30 | |
| 2019/0054765 A1* | 2/2019 | Thrash | B60B 27/023 | |
| 2019/0127022 A1* | 5/2019 | Komatsu | F16D 1/10 | |
| 2019/0225302 A1* | 7/2019 | Emura | F16H 55/12 | |
| 2020/0122805 A1* | 4/2020 | Zubieta Andueza | B62M 9/10 | |

* cited by examiner

REAR WHEEL SPROCKET ARRANGEMENT

This application claims priority to, and/or the benefit of, German patent application DE 10 2018 203 023.5, filed Feb. 28, 2018, and German patent application DE 10 2018 133 324.2, filed Dec. 21, 2018, the contents of which are incorporated herein in their entirety.

FIELD OF INVENTION

The invention relates to a bicycle rear wheel sprocket arrangement, and specifically to a bicycle rear wheel sprocket arrangement with integral partial sprocket arrangements connected to each other.

BACKGROUND

A bicycle rear wheel sprocket arrangement and a bicycle drive assembly are known from DE 10 2015 205 736 A1.

The rear wheel sprocket arrangement known from DE 10 2015 205 736 A1 has a very large spread, i.e. a very large difference in the number of teeth between the smallest and the largest sprocket. This also causes the diameters of the smallest and the largest sprocket to greatly differ. The largest sprocket is therefore subject to considerable mechanical stress when the bicycle chain is in engagement with the largest sprocket. Due to the oblique position of the bicycle chain relative to a longitudinal center plane of the bicycle, which is orthogonal to the sprocket rotation axis, when the chain is in positive-locking engagement with the largest sprocket, the largest sprocket is not only loaded at its radially outermost section by the bicycle chain with forces in the circumferential direction, but also with forces acting in the axial direction and, due to the point of application of the force at the sprocket's rim being located radially far from the sprocket axis of rotation, can cause a considerable bending effect about a bending axis orthogonal to the sprocket axis of rotation.

The sprocket arrangement known from DE 10 2015 205 736 A1 has a first partial arrangement, which only comprises the largest sprocket, and has a second partial arrangement, which is connected to said first partial arrangement and, as an integral sprocket dome, which includes all of the other sprockets from the second largest sprocket to the smallest sprocket. Fastening pins protruding axially from the sprocket dome penetrate fastening openings in fastening surfaces of the first partial arrangement that are formed on the first partial arrangement. The fastening surfaces span a pair of circumferentially-adjacent sprocket spokes of the first partial arrangement to provide sufficient material for the formation of the fastening openings.

The fastening pins are manufactured with a larger diameter than the fastening openings. The fastening pins are fitted into the fastening openings with a press fit. When pressed into the fastening openings, the ends of the fastening pins expand radially ("in mushroom form"), thereby creating, in addition to the friction fit, a positive-locking action which holds the second partial arrangement on the first partial arrangement. The two partial arrangements are therefore nondetachably connected to each other and cannot be separated without destroying components or parts of components.

However, the fastening openings with the mushroomed fastening pins in them may weaken the fastening surfaces, which can result in stress peaks and crack formation and/or other similar damage when subjected to the forces and moments acting on the sprocket arrangement during operation.

It is therefore desirable to increase the mechanical strength of the sprocket arrangement to ensure greater stability during operation than the known sprocket arrangement of the prior art.

This can be achieved by a partial arrangement consisting of first and second partial arrangements, one of which has a plurality of elastically deformable latching formations, which are in latching engagement with a plurality of mating latching formations of the other partial arrangement. This latching engagement secures the two partial arrangements together and prevents separation from one another in the axial direction.

SUMMARY

In an embodiment, a bicycle rear wheel sprocket arrangement is rotatable about a sprocket rotation axis. The sprocket rotation axis defines an axial direction and radial directions orthogonal thereto. The sprocket axis of rotation also defines a circumferential direction encircling it. The rear wheel sprocket arrangement comprises a plurality of sprockets of different size and number of teeth arranged coaxially with respect to the sprocket axis of rotation and connected to one another for joint rotation about the sprocket rotation axis, wherein the sprocket arrangement has a first partial arrangement comprising the largest sprocket, and a second partial arrangement comprising a plurality of sprockets formed integrally with one another. A partial arrangement consisting of first and second partial arrangements, one of which has a plurality of elastically deformable latching formations, which are in latching engagement with a plurality of mating latching formations of the other partial arrangement, wherein the latching engagement secures the two partial arrangements together and prevents separation from one another in the axial direction.

DETAILED DESCRIPTION OF THE DRAWINGS

Figure 1:
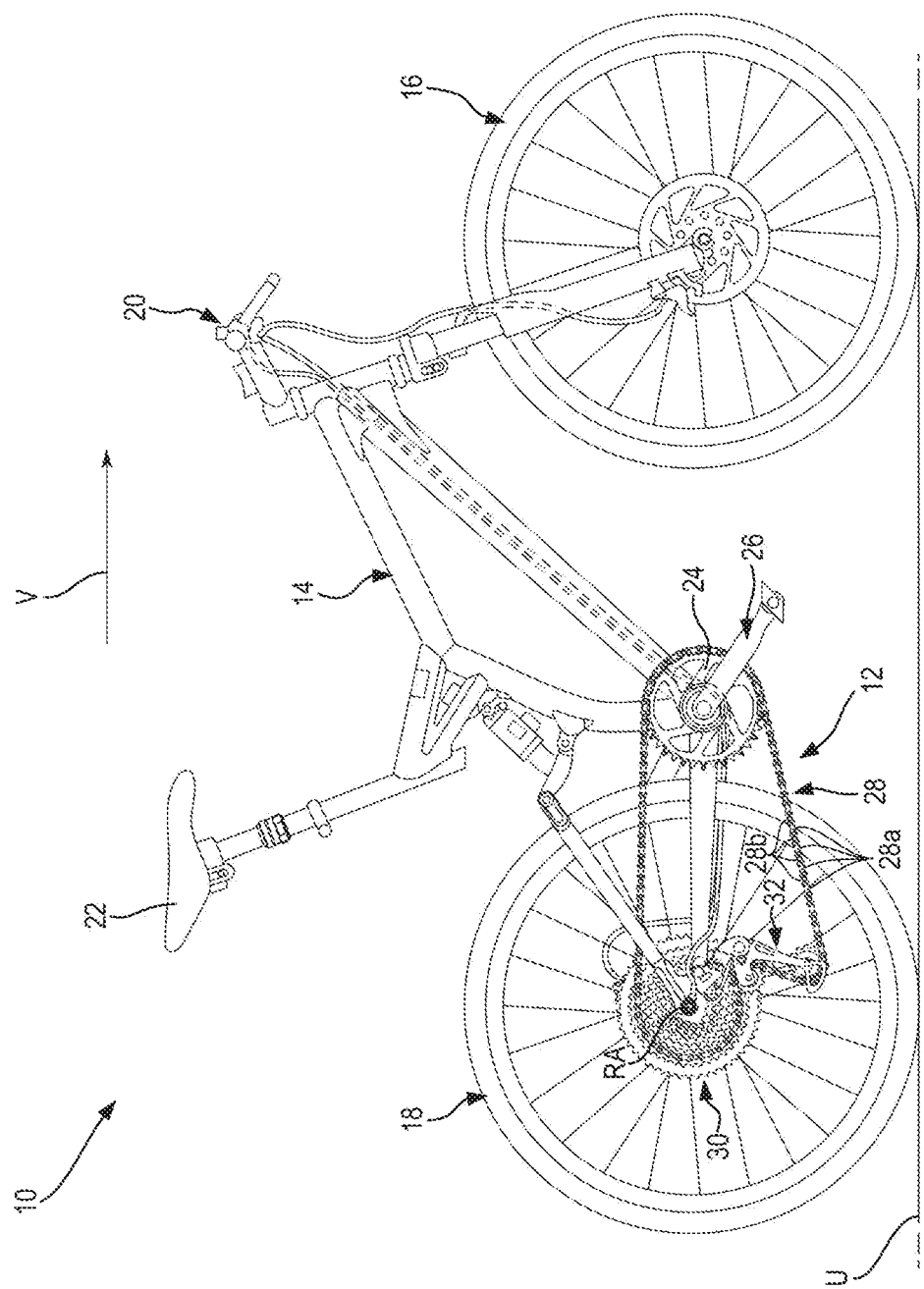
FIG. 1 shows a schematic side view of a bicycle with a bicycle drive assembly.

An embodiment includes a bicycle rear wheel sprocket arrangement with a first and second partial arrangement secured to one another by a plurality of elastically-deformable latching formations on one partial arrangement which are in latching engagement with a plurality of mating latching formations of the other partial arrangement.

In an embodiment, a bicycle drive assembly is provided which comprises a bicycle chain and a bicycle rear wheel sprocket arrangement, which can be brought into positive-locking engagement with the bicycle chain to transmit driving forces. The bicycle chain has rollers connected to one another in a known manner by means of outer and inner link plate pairings alternating along the longitudinal direction of the chain.

The term "latching" refers to a positive-locking engagement, produced using the material and component elasticity of the latching formations, optionally also of the corresponding mating latching formations, by elastic deformation of the formations. The latching can therefore be differentiated from a connection of the first and the second partial arrangement by screwing or by a bayonet closure, which cannot achieve engagement by only temporary elastic deformation of the formation.

Latching the two partial arrangements together allows for transmission of forces along the sprocket rotation axis. The axial forces occurring during operation of the sprocket arrangement are caused by the chain skew, which is greater with more sprockets on the rear wheel sprocket arrangement and/or more chain rings on the pedal crank. The axial forces acting on a rear wheel sprocket arrangement during operation are non-negligible and should not be underestimated.

The latching formations and mating latching formations can be formed on the respective partial arrangements without weakening components, unlike, for example, removing material to create fastening openings, as in the prior art.

In addition, the latching engagement between the first and second partial arrangements connects them to each other without the need for separate components, such as screws, nuts and rivets, which not only simplifies assembly, but also increases the component strength since no accommodating formations for separate connecting means have to be provided.

In principle, it is conceivable that a group of formations consisting of latching formations and mating latching formations could be formed on a component which is itself mounted on the first and/or the second partial arrangement. However, strength is maximized by minimizing the number of installation points and components. Thus, it is preferable that the latching formations and/or mating latching formations are formed integrally with the corresponding partial arrangement, respectively.

Despite the complex shapes of the partial arrangements, such an integral formation can be achieved through a multi-stage machining process characterized by a primary forming and/or deforming machining phase followed by a metal-cutting machining phase. For example, a component blank may first be cast and/or forged before it is given its final shape by metal-cutting machining, such as by turning and milling.

The latching engagement is intended to fix the first and second partial arrangements relative to one another not only axially, but also radially and in at least one circumferential direction. This can be achieved by the latching formations having axial projections which protrude axially from the corresponding partial arrangement. Depending on their orientation and configuration, the axial projections can serve as mechanical stops in an axial direction and preferably also in a direction orthogonal to the sprocket rotation axis, and can thus prevent a relative movement of the first and of the second partial arrangement in the axial direction and preferably also in the direction orthogonal to the sprocket rotation axis.

In order to axially fix the first and the second partial arrangement relative to each other, the axial fixing projections may have a latching lug at a particular axial distance from the base of the projections that is oriented circumferentially about the projections along the sprocket axis of rotation and/or in the radial direction. The latching lug can then engage behind a corresponding mating latching formation and can thus limit axial movement of the first and the second partial arrangement in at least one direction.

The axial fixing projections bendably protrude from their base regions such that they are preferably deformable in the radial and/or circumferential. They are preferably rigid in the axial direction to maximize securing forces in the axial direction.

An axial fixing projection can prevent any movement between the first and second partial arrangements in the axial direction when the axial fixing projection holds a fixing portion of a mating latching formation in a holding space defined in a first direction by the latching lug and in a second, opposite direction by a holding formation, which is spaced apart from the latching lug and extends parallel to the latching lug. The holding formation can be any desired formation. Preferably, it is the base portion from which the projection extends axially away from the partial arrangement. For example, in an embodiment, the surface of the base portion that faces the latching lug acts as a contact surface that abuts the fixing portion of the mating latching formation, which is secured by the latching lug against lifting off. In an embodiment, a plurality of axial fixing projections, for example all of the axial fixing projections, are designed to provide the above-mentioned holding space.

In order to fix the first and the second partial arrangement relative to each other in the radial and/or circumferential direction, the axial projections of either partial arrangement may act as stop projections with a stop surface which faces in a direction of action with a direction component orthogonal to the sprocket rotation axis and which abuts to the stop portion of a corresponding mating stop formation. Depending on whether a stop projection is intended to prevent a relative movement of the two partial arrangements in the radial or in the circumferential direction, the direction of action is a radial direction or a circumferential direction, respectively. The direction of action preferably has direction components both in the radial direction and in the circumferential direction, and therefore a stop projection can prevent or limit a relative movement of the two partial arrangements in either direction. In principle, it is possible that the direction of action includes a direction component in the axial direction, but the direction components of the direction of action are preferably exclusively orthogonal to the sprocket rotation axis. This avoids forces acting on the stop projections in the axial direction.

For simplicity, some, but preferably all, of the stop projections are formed on the same partial arrangement as the latching formations, specifically the axial fixing projections. In this case, the mating stop formation in contact with a stop projection is preferably a mating latching formation. The directions of action of the various stop projections preferably face in different directions such that each either extends or has a direction component in a direction orthogonal to the sprocket rotation axis.

To prevent movement of the two partial arrangements relative to one another not only in a radial direction or/and not only in a circumferential direction, at least one of the partial arrangements preferably has mating stop projections each with a mating stop surface, facing opposite the direction of action, that has a direction component orthogonal to the sprocket rotation axis and which abuts a corresponding mating stop portion of a mating stop formation. The radial direction components or/and the direction components in the circumferential direction of the direction of action and counter direction of action of stop surfaces and mating stop surfaces that make contact with one another face in opposite directions. The counter direction of action preferably runs, without an axial component, only in the direction orthogonally to the sprocket rotation axis. The mating stop formation can also be a mating latching formation.

The mating stop projections are also preferably effective both in the radial direction and in the circumferential direction. The mating stop projections function in substantially the same manner in the direction opposite the direction of action as do the stop projections in the direction of action.

When first and the second partial arrangement are connected, the stop projections and mating stop projections ensure that the latching engagement once formed cannot be separated again by relative movement of the partial arrangements. To maximize the operational reliability of the sprocket arrangement, the latching engagement is preferably virtually inseparable. This is achieved as a result of the large number of axial fixing projections, which would all have to be deformed simultaneously in order to decouple the partial arrangements.

The first and second partial arrangements are preferably connected via latching engagement coaxially along the common sprocket rotation axis by exerting force on the two partial arrangements toward one another in the axial direction, preferably only in the axial direction. Coupling the partial arrangements in this manner elastically deforms the axial fixing projections due to the latching lug, which can be further facilitated by the presence of an oblique surface on the longitudinal end of at least some of the mating stop projections, preferably all of the mating stop projections. The mating stop surface is placed axially between the oblique surface and the root region, from which the mating stop projections project. The oblique surface is inclined here in such a manner that a body moving axially on it in the direction toward the root region approaches in the radial direction or/and in the circumferential direction of the mating stop surface. Mating stop projections are preferably formed on the same partial arrangement as both the axial fixing projections and the stop projections.

When stop and mating stop projection pairs, wherein the axial fixing projections can also represent stop projections, are arranged such that they hold a mating stop formation between them, which may be a mating latching formation, in a way that prevents any movement orthogonal to the sprocket rotation axis when the partial arrangements are latched together, exerting an solely axial joining force on the two partial arrangements suffices to connect them, because the oblique surfaces forcedly guide the latching and mating latching formations into the latching engagement. The oblique surfaces reduce the deformation of the axial projections since the oblique surfaces guide the mating latching formations in a slightly rotational direction about the sprocket rotation axis, which reduces the degree to which the projections have to deform as compared to simply forcing the mating latching formations around the latching lugs in order to access the holding spaces from a purely axial direction.

The number of axial projections required for a secure latching engagement can be kept low because at least some—preferably all—of the axial fixing projections are also stop projections. One side of the axial fixing projection situated axially between the latching lug and holding formation, particularly the root region, acts as or at least has such a stop surface.

The axial projections are preferably formed on an annular sprocket rim of a sprocket of the corresponding partial arrangement and protrude axially from said sprocket. The axial projections are arranged at a particular circumferential distance from one another. Due to the way they are arranged on the sprocket, the radial distance between different axial projections is smaller than their circumferential distance from one another.

The axial projections preferably serve as axial fixing projections, as stop projections and as mating stop projections in order to fix the two partial arrangements to each other relative to their cylindrical coordinate system—comprising the axial, radial, and circumferential directions—to achieve an unambiguous positional relationship sufficiently secure to withstand the forces and moments acting on them during operation. To ensure a secure connection, the axial projections can form a plurality of projection groups, each of which having at least one axial fixing projection and a mating stop projection. This suffices if the axial fixing projection also constitutes a stop projection. At least some, but preferably all of the projection groups may also have a stop projection. In a preferred embodiment, each projection group on its own secures the two partial arrangements to each other in relative to movement along the axial cylindrical coordinate direction and at least one further cylindrical coordinate direction, but preferably along all three cylindrical coordinate directions.

The load-bearing capacity of the latching engagement is maximized by providing a plurality of projection groups, but the fastening of the two partial arrangements to each other by a plurality of projection groups, each individual projection group fixing the two partial arrangements to each other in the axial direction and a further cylindrical coordinate direction, or even all three cylindrical coordinate directions, is mechanically overdetermined. The effects of the mechanical overdetermination can be reduced, however, by the elasticity of the latching formations and/or mating latching formations since they can dissipate excessive mechanical stresses due to mechanical overdetermination through elastic deformation. A mechanically-loaded component may either have internal stresses, in which case it deforms only slightly or not at all, or can elastically deform, in which case it endures only slight, if any, internal stresses. Thus, the effect of the mechanical overdetermination is mitigated, and the latching engagement will still be strong. This arrangement therefore provides overall advantages.

The projection groups may be identical in design and are distributed along the entire circumference of the corresponding partial arrangement, preferably equidistant from one another. Using a multiplicity of projection groups—more than three or four, for example—also ensures the latching engagement is inseparable as stated above. Although the elasticity of a single axial fixing projection can cause its connection to a mating latching formation to come undone if it deforms, it is increasingly difficult to simultaneously deform a plurality of axial fixing projections the greater their number. The latching lugs preferably protrude from their corresponding axial fixing projections in different directions orthogonal to the sprocket rotation axis. To detach the latching engagement, not only would a plurality of axial fixing projections have to deform, but each would have to deform in a different direction, which is factually and practically impossible.

While it is possible that the axial projections for the latching engagement could be arranged on the first partial arrangement, they are preferably provided only on the second partial arrangement.

To avoid unnecessary added weight which will require the cyclist to work harder, it is preferable for a sprocket of one or both partial arrangements to have a radially outermost region with teeth and a radially innermost hub region that transmits torque to the rear wheel hub, wherein the hub region and toothed region are connected to each other by a plurality of spokes arranged at a circumferential distance from one another. The sprocket region farther from the sprocket rotation axis transmits force between a bicycle chain and the sprocket arrangement. The hub region placed closer to the sprocket rotation axis serves in a known manner for transmitting torque from the sprocket arrangement to a rear wheel hub, for example with the intermediate arrangement of a Cassette driver.

It is highly efficient for the mating latching formations to include a plurality of sprocket spokes which are present anyway. In this case, the mating latching formations need not be specially formed.

Since the arrangement of sprocket spokes, especially in the case of sprockets of larger diameter, promises a high saving on weight compared with a solid design of the sprocket, the sprocket spokes and therefore the mating latching formations are preferably formed on the first partial arrangement because it has the largest sprocket of the sprocket arrangement.

In principle, sprocket spokes can run continuously starting from the hub region as far as to the toothed region. Since the spokes would diverge the farther they get from the hub region, this would result in a significantly greater concentration of spokes near the hub region compared to the toothed region. The challenge with this is that the force on the sprocket from the chain occurs at the radially outermost portion of the sprocket. Thus, to effectively and securely transmit torque from the toothed region to the hub region, it is advantageous to provide separate radially inner and outer sets of sprocket spokes, the radially outer set having a greater number of spokes than the radially inner set. Since the latching formations that engage the sprocket spokes, which serve as mating latching formations, are arranged in the toothed rim region of the other partial arrangement, the latching formations lie radially further to the outside than to the inside. Therefore, the mating latching formations preferably comprise outer sprocket spokes, and preferably only the outer spokes.

The mating stop formation mentioned above is preferably also a sprocket spoke, particularly an outer sprocket spoke.

To provide sufficient elasticity to mitigate any excessive mechanical stresses due to overdetermination of the partial arrangement connection, the abovementioned fixing portion of a sprocket spoke, acting as a mating latching formation, is preferably relatively distant from the two longitudinal ends of the sprocket spoke. The same applies to the stop portion or/and the mating stop portion of a sprocket spoke as a mating stop formation for the same reason. The fixing and/or stop and/or mating stop portions preferably lie in a middle third of the longitudinal extent of the sprocket spoke, as measured along its optionally curved profile, which may serve as a mating latching formation and/or a mating stop formation. This applies particularly when the mating latching formation and/or the mating stop formation is formed by an outer sprocket spoke.

The spoke region arranged radially between the toothed region and the hub region preferably includes a coupling ring region, which defines the boundary where the inner sprocket spokes end and the outer sprocket spokes begin. The coupling ring region preferably spans a region from one third to two thirds of the radial extent of the region covered by sprocket spokes. In a preferred embodiment, the coupling ring region spans a region from one third to $7/12$ths of the radial extent of the spoke region.

The axial fixing projections and mating stop projections, and possibly other stop projections, could engage an individual sprocket spoke to fix the two partial arrangements to one another in all cylindrical coordinate directions. However, the mechanical load borne by individual sprocket spokes by the latching engagement between the first and the second partial arrangement can be reduced by using a plurality of spoke groups, each comprising at least two sprocket spokes. Each spoke group preferably engages a projection group, as described above, to form an engagement combination. The sum of all engagement combinations comprises the latching and contact engagements connecting the two partial arrangements to each other in both circumferential directions for transmitting torque.

To form as many engagement combinations as possible in the circumferential direction with the involvement of a plurality of sprocket spokes for each engagement combination, it is preferable for adjacent spokes, particularly two adjacent spokes, to form a spoke group. As previously mentioned, the sprocket spokes are preferably outer spokes, and therefore it is preferable to provide an even number of outer sprocket spokes.

It is possible for the sprocket spokes to run directly from the hub region or coupling ring region to the toothed region in a straight line. However, this configuration is not preferred because it is not ideal for bearing the load on the sprocket. To more effectively sustain the forces due to torques, which occur on the sprocket arrangement during intended operation, and to minimize the thickness of the spokes, it is preferable for the sprocket spokes to be angled such that the end of the spokes radially nearer to the sprocket rotation axis precede the end radially nearer to the tooth region relative to the rotational driving direction of operation. In a preferred embodiment, the sprocket spokes are curved convexly, when viewed from the direction counter to the driving direction of rotation. This is preferably the case for both the radially inner and radially outer sprocket spokes.

A further advantage of sprocket spokes configured in this way and serving as mating latching formations is that forces between the latching formations and the sprocket spokes can be transmitted in both the circumferential and radial directions.

The latching formations thus engage the sprocket spokes where the spokes have a fixing portion and are inclined at an angle at least between 35° and 60°, but preferably between 40° and 50°, relative to the radial direction. Any forces transmitted between the latching formations and the sprocket spokes are thus evenly distributed between the radial and circumferential directions. The latching formations and sprocket spokes preferably make contact at a stop surface or a mating stop surface on the side of the sprocket spokes, as well as from behind the sprocket spokes, due to the latching lug of the axial fixing projections. Therefore, a stop portion and/or mating stop portion of a sprocket spoke forming a mating stop formation is preferably arranged in a region of the sprocket spoke in which said sprocket spoke is inclined, preferably at an angle at least between 35° and 60°, but particularly preferably between 40° and 50°, relative to the radial direction.

The sides of the sprocket spokes, specifically the outer sprocket spokes, which are present anyway, thus preferably make contact with the stop surfaces of the stop projections, with the mating stop surfaces of the mating stop projections, with the latching lugs, and optionally also with the holding formations of the axial fixing projections. The sum of these contact engagements, which act in different directions, results in a secure latching engagement.

To facilitate the locking engagement between the two partial arrangements as described above, the cross-section of the portions of the sprocket spokes that engage the axial fixing projections are of a polyhedral configuration, preferably rectangular, when viewed along the length of the spoke. In the case of the preferred spoke configuration with rectangular cross section, two parallel edges of the rectangular cross section are formed by the two end sides of the sprocket spokes, and the two other parallel edges are formed by the flanks of the sprocket spokes that connect the two end sides.

In the sprocket arrangement known from DE 10 2015 205 736 A1, the first partial arrangement only comprises the largest sprocket. However, greater flexural rigidity, which prevents bending, especially of the first partial arrangement since the outermost portion of it is particularly far from the sprocket rotation axis, is achieved when the first partial arrangement comprises the two largest sprockets, formed integrally with each other. The advantages of this configuration can be applied to a bicycle rear wheel sprocket arrangement as described above, regardless of any latching engagement between the first and second partial arrangements.

Regardless of the configurations of the toothed region, spoke region, and hub region, the flexural strength of the first partial arrangement is greater when the hub region of the largest sprocket is axially farther outboard—that is, closer to the smallest sprocket—than the toothed region.

For further reinforcement, the first partial arrangement can have an annular axial bead in a radial reinforcing region between the root radii of the largest sprocket and the second largest sprocket. The axial bead is formed as a depression on one side of the first partial arrangement and preferably as a protrusion on the opposite side. The axial bead is preferably designed as an axial depression on the outboard side of the reinforcing region, facing the second largest sprocket.

To maintain uniform distribution of force across the first partial arrangement when the bicycle chain is in engagement with the largest sprocket or the second largest sprocket, while keeping weight down, it is preferable for the sprocket spokes to reach radially outward as far as the teeth of the largest sprocket, wherein the number of outer sprocket spokes is half that of the number of teeth of the second largest sprocket. The beneficial effects of this force-distributing configuration can be applied to a bicycle rear wheel sprocket arrangement as described above, the first partial arrangement of which is designed according to the present paragraph, regardless of a latching engagement between the first and second partial arrangements. Said sprocket arrangement formed in this manner can have further advantageous features as are described in the present application.

When viewing the first partial arrangement in the axial direction, each sprocket spoke and every other tooth of the second largest sprocket are placed at the same circumferential position. The other teeth, positioned circumferentially between the sprocket spokes, are thus easily accessible from the axial direction, which simplifies the manufacturing process. Additionally, when sprocket spokes circumferentially align with teeth of the second largest sprocket, force transmission between the two largest sprockets takes place directly at the point where force is transmitted from the bicycle chain to the second largest sprocket. Whenever the second largest sprocket is in force-transmitting engagement with the bicycle chain, the torque introduced into the first partial arrangement by the bicycle chain can therefore be transmitted especially simply and securely to the hub region via the sprocket spokes.

At least the second largest sprocket, but preferably both the largest and second largest sprocket, of the first partial arrangement preferably has alternating axially thicker and thinner teeth. This simplifies the assignment of inner and outer link plate regions of a bicycle chain interacting with the sprocket arrangement to the sprocket teeth at least of the second largest sprocket, in particular also of the largest sprocket, which helps to prevent chain breaks. Preferably, at least some of the teeth of the second largest sprocket that circumferentially align with the sprocket spokes are of axially thicker design than the adjacent teeth in between them. This configuration creates a relatively small axial gap between the axially thicker teeth of the second largest sprocket and the aligned sprocket spokes that accommodates the bicycle chain—preferably only the outer link plates of the bicycle chain—with little clearance. If a sprocket spoke and a tooth are circumferentially aligned, they overlap when viewed in the axial direction. The same formation of sprocket spoke and tooth that has the larger size in the circumferential direction, preferably completely overlaps the respective other formation in the circumferential direction.

Regardless of which sprocket it is on, an axially thicker tooth may be configured as follows: the axially outboard-facing lateral tooth flanks, which axially face the next smaller sprocket, of the alternatingly thicker and thinner teeth lie on a common virtual enveloping surface which is preferably rotationally symmetrical relative to the sprocket rotation axis. Starting from the common virtual enveloping surface, the axial thicker teeth extend farther axially outboard towards the next larger sprocket than the axially thinner teeth. The tooth flank of the axially thicker teeth that leads relative to the driving direction of rotation is preferably not stepped while the opposite, trailing tooth flank has an axial step on the side facing the next larger sprocket. In other words, starting from a common leading tooth flank, the axially thicker teeth are not as circumferentially wide on the inboard side as on the outboard side. Viewing from the radial outside in the radially inward direction, that is, toward the central sprocket rotation axis, an axially thicker tooth therefore has a roughly L-shaped cross-section. This L-shaped cross-sectional surface helps guide the bicycle chain when it is in positive-locking engagement with the sprocket. This effect may be achieved independently of whether there is a latching engagement of two partial arrangements and also applies to a sprocket arrangement as described above, which may have teeth with the described L-shaped cross-section from the largest sprocket to the second smallest sprocket. A plurality of sprockets with an even number of teeth preferably has teeth of this design and ideally, each sprocket with an even number of teeth has such teeth. A sprocket arrangement of this type can be advantageously refined further as described in the present application.

Preferably, all of the sprockets with an even number of teeth have alternating axially thinner and thicker teeth as described in the preceding paragraph, at least over part of the circumference of the sprocket. Only the smallest sprocket, which preferably has 10 teeth, has axially thicker teeth, the inboard lateral tooth flank of which facing the next larger sprocket is oriented on a the same virtual enveloping surface as the inboard tooth flank of the axially thinner teeth, wherein the axially thicker teeth starting from the common enveloping surface extend axially further away from the next larger sprocket than the axially thinner teeth arranged in between. The two lateral tooth flanks are also of different circumferential widths on the smallest sprocket such that the inboard lateral tooth flank is wider than the outboard lateral tooth flank. As opposed to the other sprockets with an even number of teeth, the inboard lateral tooth flank of the smallest sprocket facing the next larger sprocket extends beyond the outboard lateral tooth flank of the same tooth facing away from the next larger sprocket, on both sides in the circumferential direction. This creates an open space on both circumferential sides of the outboard side of the teeth on the smallest sprocket that is designed to accommodate the edges of link plates, specifically the outer link plates, of the bicycle chain. This configuration of the smallest sprocket affects the skew of the bicycle chain when it engages the smallest sprocket so as to prevent unwanted contact between the chain and the next largest sprocket. With at least one, but preferably multiple or ideally all, of the axially thicker teeth, the transition from the tooth flank which is longer in the circumferential direction to the tooth flank which is shorter in the circumferential direction is stepped at least at one circumferential longitudinal end of the tooth, preferably at both circumferential longitudinal ends, preferably in a single step, in order to form, by means of this stepped formation of the tooth flank, the receiving region for a chain link plate of the bicycle chain. This effect of reducing chain skew may be achieved independently of whether there is a latching engagement of two partial arrangements, and also applies to a sprocket arrangement as described above, the smallest sprocket of which is as described in this paragraph. One or more of the features of the present application can be applied to such a sprocket arrangement.

As opposed to the approximately L-shaped cross section of the axially thicker teeth on other sprockets, the axially thicker teeth on the smallest sprocket have an approximately T-shaped cross section when viewed from the radial outside inward.

The second partial arrangement preferably has more sprockets than the first partial arrangement, and ideally at least two, three, or even four times as many. For example, the second partial arrangement can thus include between 6 and 12 axially consecutive sprockets, which are formed integrally with one another. A number of sprockets totaling approximately 7 or 8 sprockets can be used here for E-bikes and pedelecs, which can tolerate larger differences in tooth number between directly adjacent sprockets because the motor assists the cyclist.

The second partial arrangement preferably includes the third largest sprocket of the entire sprocket arrangement. This sprocket is preferably also the largest sprocket of the second partial arrangement.

The second partial arrangement may also include the smallest sprocket. Preferably, the sprocket arrangement only includes the first and second partial arrangements, without any additional partial arrangements, and also does not include an additional individual sprocket. This configuration facilitates installation of the sprocket arrangement by keeping the required number of components low. Although this is the preferred embodiment, it is possible to include more partial arrangements or individual sprockets in addition to the first and second partial arrangements.

To reduce weight, the individual, integrally formed sprockets of the second partial arrangement are connected to one another by webs. The webs connecting two axially directly adjacent sprockets may not reach radially inward beyond the toothed rim of the smaller of the two sprockets. The webs, formed integrally with the sprockets, transmit force between a pair of axially adjacent sprockets of the second partial arrangement, and preferably transmit forces between multiple pairs of adjacent sprockets to ideally include all of the sprockets of the second partial arrangement. To both reduce weight and make cleaning easier, there are preferably fewer webs connecting a pair of adjacent sprockets of the second partial arrangement than there are teeth on the smaller sprocket of the pair. If the smaller sprocket of the pair has an even number of teeth, then the preferable number of webs connecting the two sprockets is precisely half the number of teeth on the smaller sprocket. What has been stated above correspondingly applies to the half number of sprocket spokes in relation to the number of teeth of the second largest sprocket of the first partial arrangement. The number of webs may also be fewer than half the number of teeth on the smaller sprocket of the pair. The number of webs and the number of teeth on the smaller sprocket of a connected axially adjacent pair preferably have an integer common factor. This allows for every web to circumferentially align with a tooth on the smaller sprocket of a pair, which increases the rigidity of the arrangement. This configuration preferably applies to each pairing of two directly axially adjacent sprockets of the second partial arrangement for which the smaller sprocket of the pair preferably has an even number of teeth. Where a web circumferentially aligns with a tooth, the web and tooth overlap when viewed in the axial direction. The formation of web and tooth, which has the respective larger size in the circumferential direction, preferably completely overlaps the respective other formation in the circumferential direction.

Weight is also saved by producing the first partial arrangement, which includes the largest and preferably also the second largest sprocket formed integrally with one another, from a material of relatively low density, such as an aluminum alloy. The second partial arrangement, which includes more than two, but preferably approximately ten integrally-formed sprockets, is preferably produced from a higher-density material and preferably also higher elastic modulus, such as steel, to increase its strength.

The same configuration can be applied to the second partial arrangement such that the webs integrally connecting a pair of axially adjacent sprockets circumferentially align with every other tooth of the smaller sprocket of the pair when the smaller sprocket has an even number of teeth. This configuration improves the transmission of force between the integrally formed sprockets and makes at least every other tooth of a smaller sprocket with an even number of teeth more accessible during manufacturing and potentially during installation. This improved force transmission and accessibility may be achieved independently of whether there is a latching engagement of two partial arrangements, and can also apply to a sprocket arrangement as described above, by designing the second partial arrangement in this way. A sprocket arrangement formed in this manner can have further advantageous features as described in the present application.

As with the first partial arrangement, improved chain guidance and reduced risk of chain breaks can also be achieved for the second partial arrangement if for at least one sprocket pair, at least some of the teeth of the smaller sprocket that circumferentially align with webs are axially thicker than the circumferentially directly adjacent teeth. However, it is possible to circumferentially align a web with an axially thinner tooth. Such a configuration can be advantageous if the smaller sprocket is weaker in the circumferential region of a thinner tooth due to a lateral impression or recess, which may be present, for example, because of a chain ascending aid formed as a depression in the sprocket end side, in at least one of its end surfaces. The web then reinforces and/or stiffens the circumferential region around the thinner tooth. Thus, the webs of a sprocket pair need not necessarily be arranged circumferentially equidistant from one another, although this is preferred.

If the smaller sprocket of a pair has an odd number of teeth, there are as many webs as there are teeth on the smaller sprocket. However, it is possible to provide fewer webs than teeth on the smaller sprocket, although in an embodiment the number of webs and teeth have an integer common factor.

In a preferred embodiment, the webs always circumferentially align with the teeth of the smaller sprocket of a pair.

The configuration of the axially thicker and thinner teeth of the second partial arrangement is as explained above.

To transmit force and torque as effectively as possible, the webs of the second partial arrangement should not extend between a pair of sprockets in only the radial direction. The webs should preferably also have a direction component angled in the circumferential direction, ideally such that the radially innermost end trails the radially outermost end in the driving direction of rotation.

The sprocket arrangement includes eight to fourteen sprockets, preferably 12 to 14 sprockets, the smallest sprocket of which having no more than twelve, but preferably no more than ten and ideally precisely ten teeth, and/or the largest sprocket of which includes no fewer than 50, but preferably no fewer than 52 and ideally precisely 52, teeth. The advantages conferred by the arrangement of the teeth and sprocket spokes of the second largest sprocket, as well as the advantages of the alignment of webs and teeth on sprockets of the second partial arrangement, are best achieved when no more than two, but preferably only one sprocket has an odd number of teeth. In an embodiment, the respective number of teeth on each sprocket of the sprocket arrangement from smallest to the largest is as follows: 10, 12, 14, 16, 18, 21, 24, 28, 32, 38, 44, 52.

As explained above, at least a plurality, but preferably all of the sprockets with an even number of teeth have alternating axially thicker and thinner teeth along at least part of, but preferably along the entire circumference of the sprocket.

The sprocket arrangement described herein is ordinarily used with a typical bicycle chain for which the rollers are approximately equidistant along the longitudinal axis of the chain and are connected to one another by alternating pairs of inner link plates and pairs of outer link plates. The axially thicker teeth are preferably axially thicker than the width of the gap between a pair of inner link plates of the bicycle chain so that the axially thicker teeth may only engage the bicycle chain in a gap between outer link plates. When the bicycle chain engages a sprocket with an even number of teeth, it is therefore unambiguously precisely positioned along the chain longitudinal direction relative to the sprocket. This reduces the risk of chain breaks. Due to the alternating arrangement of axially thicker and thinner teeth along the circumference of sprockets with an even number of teeth, when a bicycle chain engages the sprocket arrangement, only an outer link plate of the chain is ever opposite a web and/or sprocket spoke on at least a plurality of, but preferably on all of the sprockets with an even number of teeth, except for possibly the two smallest sprockets.

The gap between a pair of outer link plates is axially wider than the gap between a pair of inner link plates.

The present application relates to a bicycle drive assembly comprising a bicycle chain and sprocket arrangement as herein described. The drive assembly preferably has precisely one chain ring on the pedal crank such that changes in transmission ratio between the pedal crank and rear wheel hub occur exclusively at the rear wheel sprocket arrangement.

FIG. 1 shows a schematic side view of a bicycle 10 with a bicycle drive assembly 12 according to an embodiment. The bicycle 10 has a frame 14 with a spring-loaded steerable front wheel 16 and a spring-loaded rear wheel 18. The front wheel 16 is steerable using the handlebars 20. A cyclist can sit during his/her journey on a saddle 22 of the bicycle 10. The forward direction of travel of the bicycle 10, which is illustrated standing on a flat underlying surface U, is indicated by the arrow V.

In the exemplary embodiment illustrated, the bicycle drive assembly 12 comprises a single front chain ring 24 coupled directly to pedal cranks 26 in a torque-transmitting manner and comprises a rear wheel sprocket arrangement 30 connected in a force-transmitting manner to the single front chain ring 24 via a bicycle chain 28 in a typical manner. The rear wheel sprocket arrangement 30 is coupled in a torque-transmitting manner to the rear wheel 18, and therefore a torque introduced to the front chain ring 24 via pedal cranks 26 is transmitted via the bicycle chain 28 and the rear wheel sprocket arrangement 30 to the rear wheel 18.

The bicycle chain 28 can be brought into force-transmitting engagement with one of, for example, twelve sprockets R1 to R12 of the rear wheel sprocket arrangement 30 by means of a derailleur 32 (not described specifically herein). The cyclist riding the bicycle 10 can thus select a transmission ratio of speed and torque from the front chain ring 24 to the rear wheel 18 in a typical manner.

Figure 2:
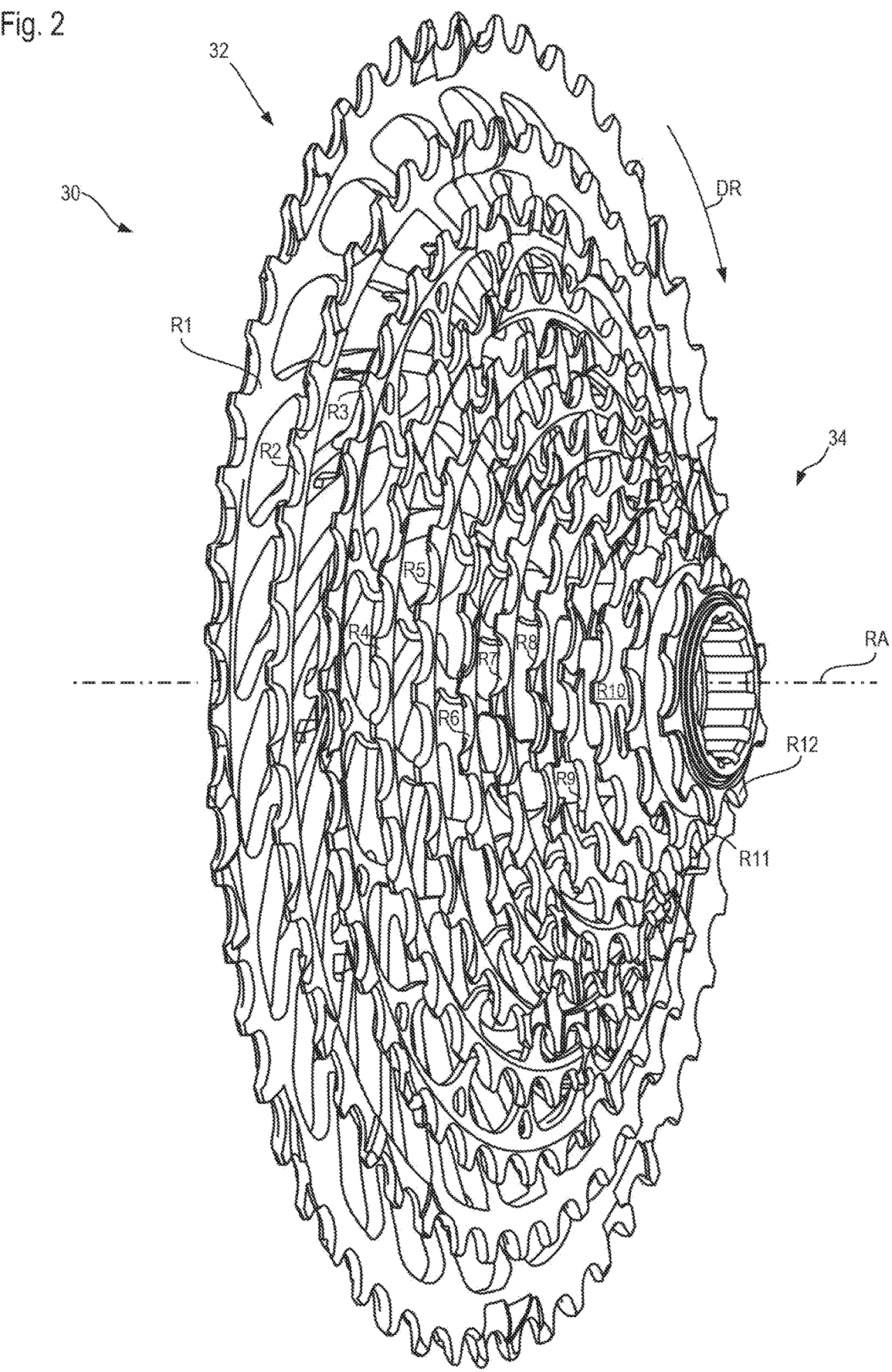
FIG. 2 shows an oblique outboard perspective view of the rear wheel sprocket arrangement of the drive assembly of the bicycle from FIG. 1.
Figure 3:
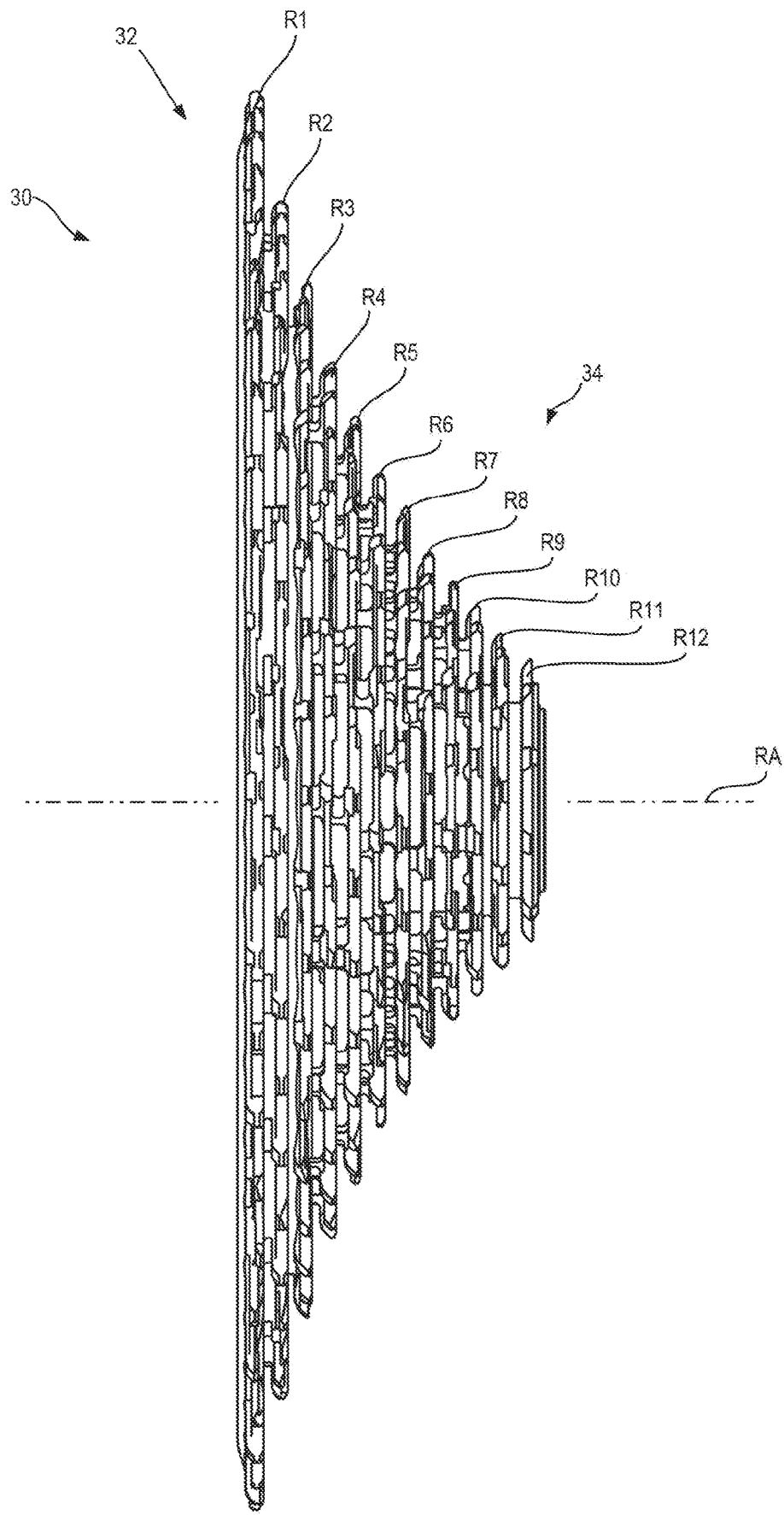
FIG. 3 shows a side view of the sprocket arrangement looking orthogonally to the sprocket rotation axis.
Figure 4:
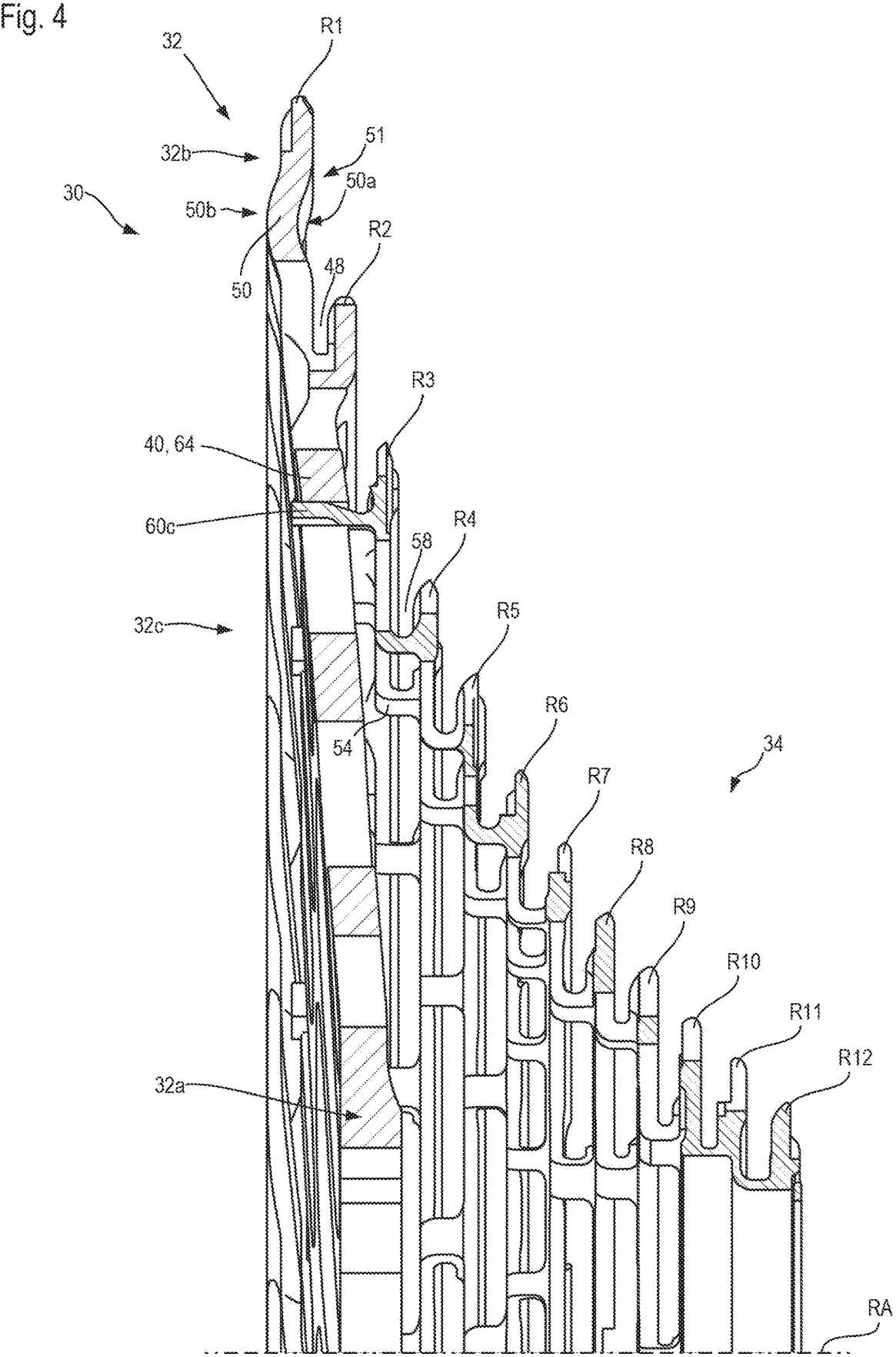
FIG. 4 shows a longitudinal sectional view of a radial half of the sprocket arrangement along a sectional plane containing the sprocket rotation axis.
Figure 5:
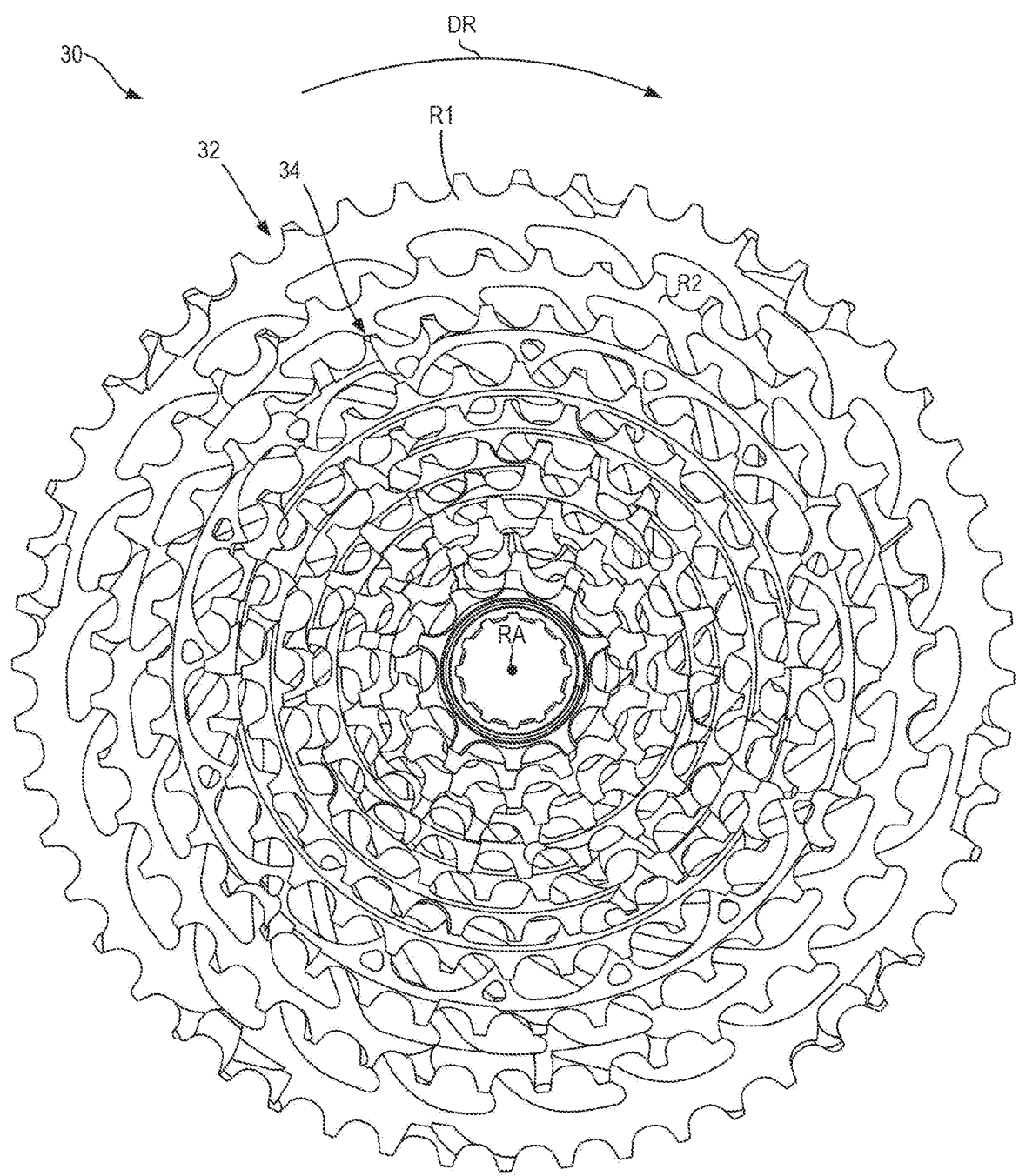
FIG. 5 shows an outboard axial view in the direction toward a longitudinal centre plane, which is orthogonal to the sprocket rotation, of the sprocket arrangement.
Figure 6:
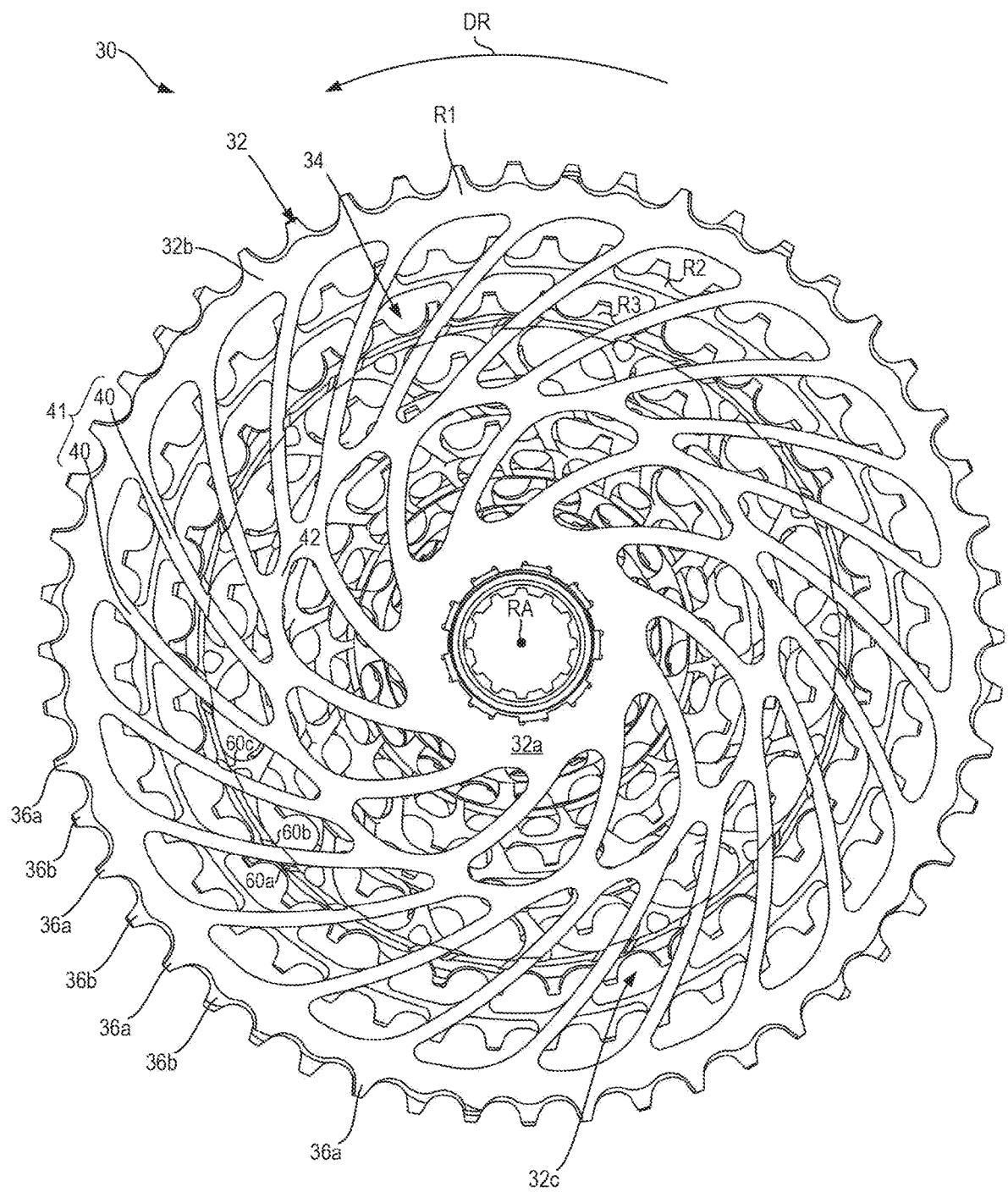
FIG. 6 shows an inboard axial view of the sprocket arrangement from FIG. 5.
Figure 7:
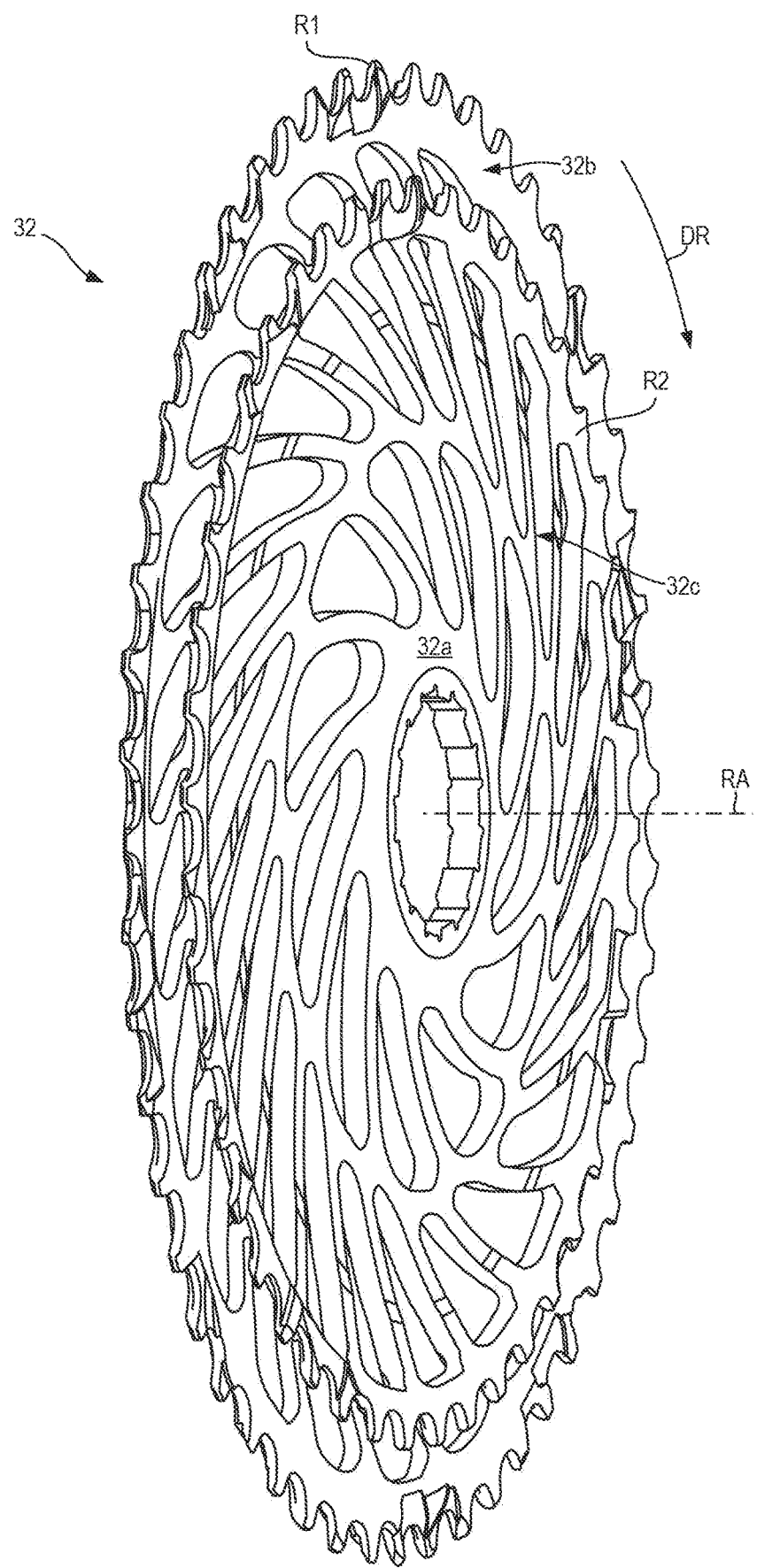
FIG. 7 shows an oblique outboard perspective view of the first partial arrangement of the sprocket arrangement.

FIGS. 2 to 6 illustrate the rear wheel sprocket arrangement 30 in detail in various views. FIG. 2 shows an oblique, outboard perspective view of the sprocket arrangement 30. FIG. 3 shows a side view of the sprocket arrangement 30, viewing orthogonally to the sprocket axis RA. FIG. 4 shows a longitudinal sectional view of a radial half of the sprocket arrangement 30 along the sectional plane containing the sprocket rotation axis RA. FIG. 5 shows an outboard axial view of the sprocket arrangement 30. FIG. 6 shows an inboard axial view of the sprocket arrangement 30.

The sprocket arrangement 30 comprises a first partial arrangement 32 which includes the largest sprocket R1, preferably having 52 teeth, and the second largest sprocket R2, preferably having 44 teeth, in an integral formation. The integrally formed first partial arrangement 32 is preferably formed from an aluminum alloy in order to reduce its weight.

The sprocket arrangement 30 furthermore includes a second partial arrangement 34, which is fixedly connected to the first partial arrangement 32 and on which all of the further sprockets R1 to R12 of the sprocket arrangement 30 are integrally formed. The sprocket R3 is the third largest sprocket, the sprocket R12 is the twelfth largest, or smallest, sprocket of the sprocket arrangement 30. The integral second partial arrangement 34 may be produced from steel to increase its strength. The third largest sprocket R3 of the sprocket arrangement 30, which is the largest sprocket of the second partial arrangement 34, preferably has 38 teeth. The smallest sprocket R12 preferably has 10 teeth.

The first partial arrangement 32 and the second partial arrangement 34 are connected to each other and are secured against axial separation from each other using a latching technique, as will be explained in detail further below. The connection formed between the first and the second partial arrangement 32 and 34 enables them to move jointly with each other in either circumferential direction about the sprocket rotation axis RA and in both opposed axial directions along the sprocket rotation axis RA.

The driving direction of rotation of the sprocket arrangement 30, in which the sprocket arrangement 30 is rotated by pedaling of the pedal cranks 26 in order to move the bicycle 10 in the forward direction of travel V, is denoted in the figures by the designator DR. From the outboard axial perspective shown in FIG. 5, the driving direction of rotation DR runs in the clockwise direction, and from the inboard axial perspective shown in FIG. 6, the driving direction of rotation DR accordingly runs in the counterclockwise direction.

As can best be seen in the views of FIGS. 4 and 6, the first partial arrangement 32 has a radially inner hub region 32a, which is designed for transmitting torque from the sprocket arrangement 30 or from the first partial arrangement 32 to a driver and therefore to a hub of the rear wheel 18. For this purpose, the radial inside of the hub region 32a has, for example, a spline toothing.

In addition, the first partial arrangement 32 has a radially outer toothed rim region 32b having teeth 36a and 36b of the largest sprocket R1. As shown in FIG. 4, the hub region 32a is arranged axially offset relative to the toothed region 32b in the direction of the smallest sprocket R12, which provides the first partial arrangement 32 with greater flexural rigidity than a flat design such that it is less susceptible to bending.

The teeth 36a of the largest sprocket R1 are axially thicker than the circumferentially-adjacent teeth 36b. The axial thickness of the thicker teeth 36a is designed to be greater than the width of the space between an inner link plate pairing of the chain 28. On the bicycle chain 28, equidistant rollers are connected to one another in a known manner by alternating outer link plate pairings 28a and inner link plate pairings 28b, wherein the width of the space between an inner link plate pairing 28b is smaller than between an outer link plate pairing 28a. In FIG. 1, the width between outer link plate pairings 28a and inner link plate pairings 28b are measured in a direction parallel to the sprocket rotation axis RA. The roller axes of the rollers of the bicycle chain 28 likewise run parallel to the sprocket rotation axis RA in FIG. 1, and said rollers are connected equidistantly from one another by the inner link plate pairings 28b and outer link plate pairings 28a. In FIG. 1, the sprocket rotation axis RA is orthogonal to the longitudinal center plane of the bicycle of FIG. 1.

Hub region 32a is connected to toothed rim region 32b by spoke region 32c radially between them.

Figure 9:
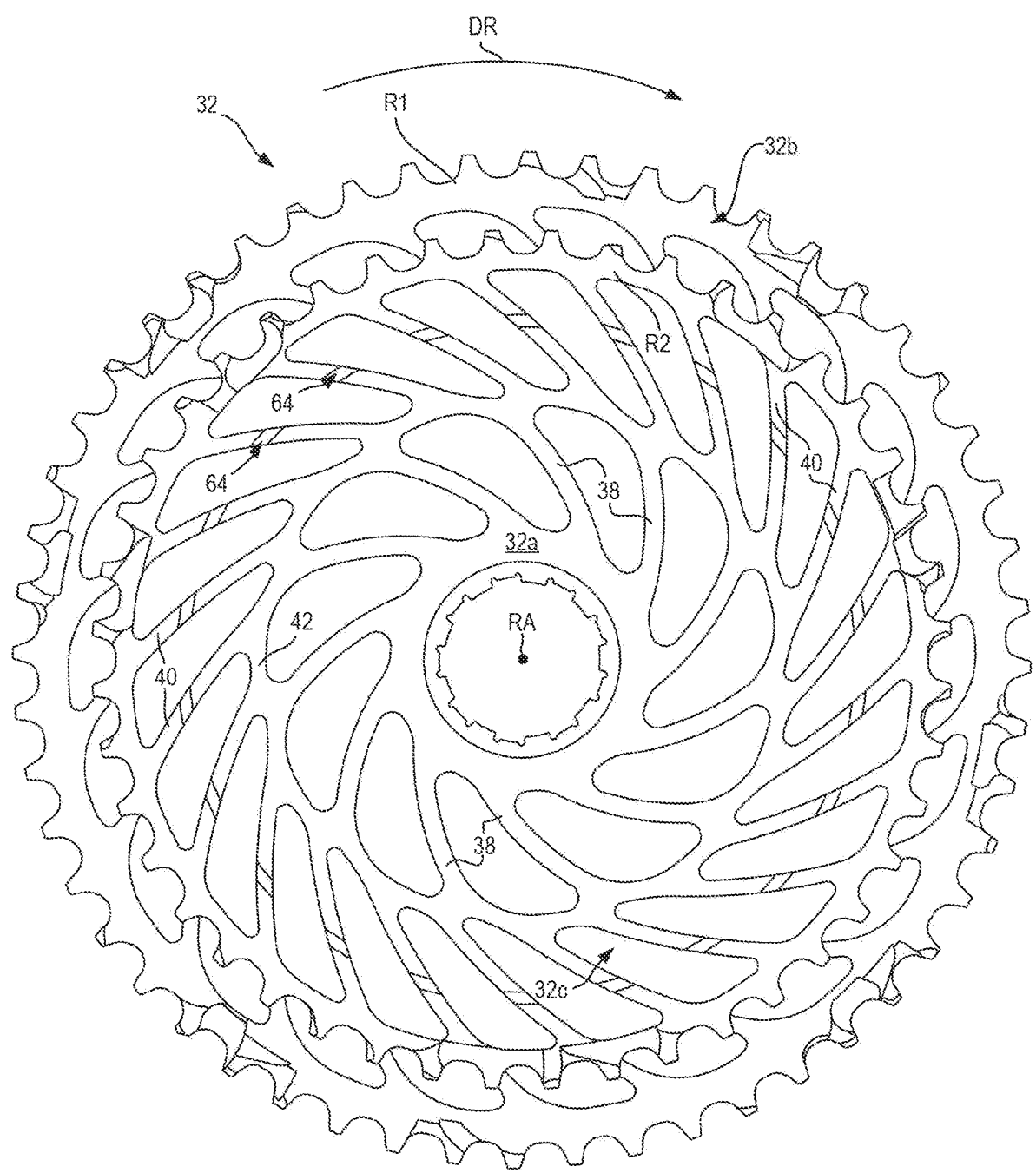
FIG. 9 shows an outboard axial view of the first partial arrangement.
Figure 10:
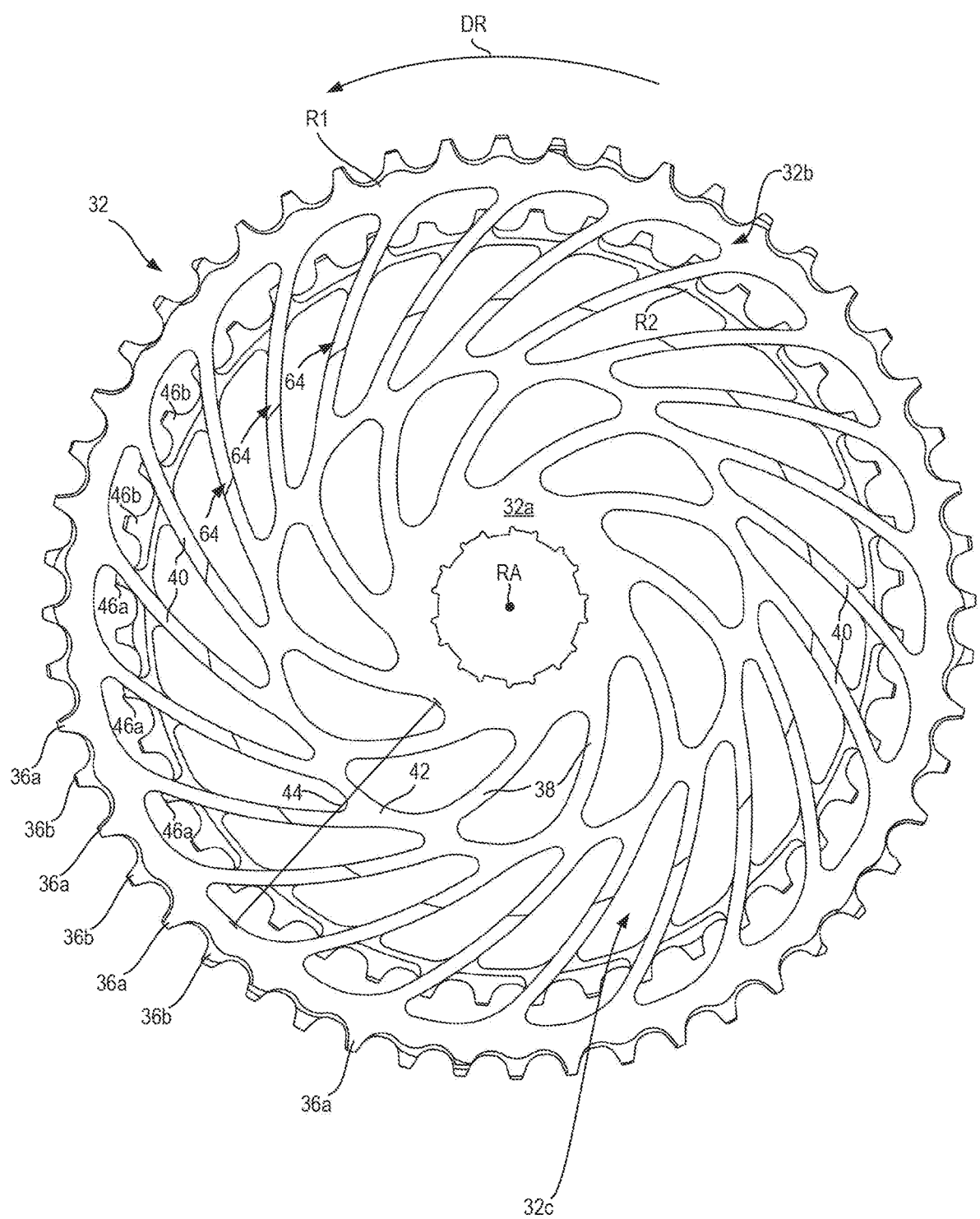
FIG. 10 shows an inboard axial view of the first partial arrangement.

As shown in FIGS. 6, 9, and 10, the spoke region 32c comprises radially inner sprocket spokes 38 and radially outer sprocket spokes 40. The radially inner sprocket spokes 38 reach from the hub region 32a to a coupling ring region 42. The radially outer sprocket spokes reach from the coupling ring region 42 to the toothed region 32b. In an embodiment, the inner and the outer sprocket spokes 38 and 40 do not overlap in the radial direction. The number of outer sprocket spokes 40 is greater than the number of inner sprocket spokes 38, for example twice as many so as to homogenously distribute forces about the sprocket rotation axis RA in the circumferential direction.

In an embodiment of the first partial arrangement 32, there are half as many outer sprocket spokes 40 as teeth on the second largest sprocket R2, said teeth being oriented axially adjacent to the outer sprocket spokes 40.

For a torsionally stiff transmission of torque from the toothed region 32b to the hub region 32a while minimizing the thickness of the spokes, the inner sprocket spokes 38 and the outer sprocket spokes 40 are formed such that, for reinforcement thereof, the radially outer end of a sprocket spoke 38 or 40 trails the radially inner end of the same sprocket spoke 38 or 40 relative to the driving direction of rotation DR. In addition, the sprocket spokes 38 and 40 are designed to be curved about an axis of curvature parallel to the sprocket rotation axis RA such that the sprocket spokes 38 and 40 are curved concavely relative to the driving direction of rotation DR.

As shown in FIG. 10, the coupling ring region 42 lies between the radially inner third and radially inner half of the extent 44 of the spoke region 32c.

As shown in FIG. 10, every second tooth 46a of the second largest sprocket R2 is located at the same circumferential position as an outer sprocket spoke 40. As a result, the teeth 46b between teeth 46a are easily accessible through the outer sprocket spokes 40 and can be machined with high precision using a milling tool.

In at least some circumferential sections of the second largest sprocket R2, the teeth 46a coinciding in respect of their circumferential position with the outer sprocket spokes 40 are axially thicker than the circumferentially adjacent teeth 46b. The axially thicker design of at least some of the teeth 46a improves the ease and stability of the integral connection of the second largest sprocket R2 to the largest sprocket R1.

Figure 8:
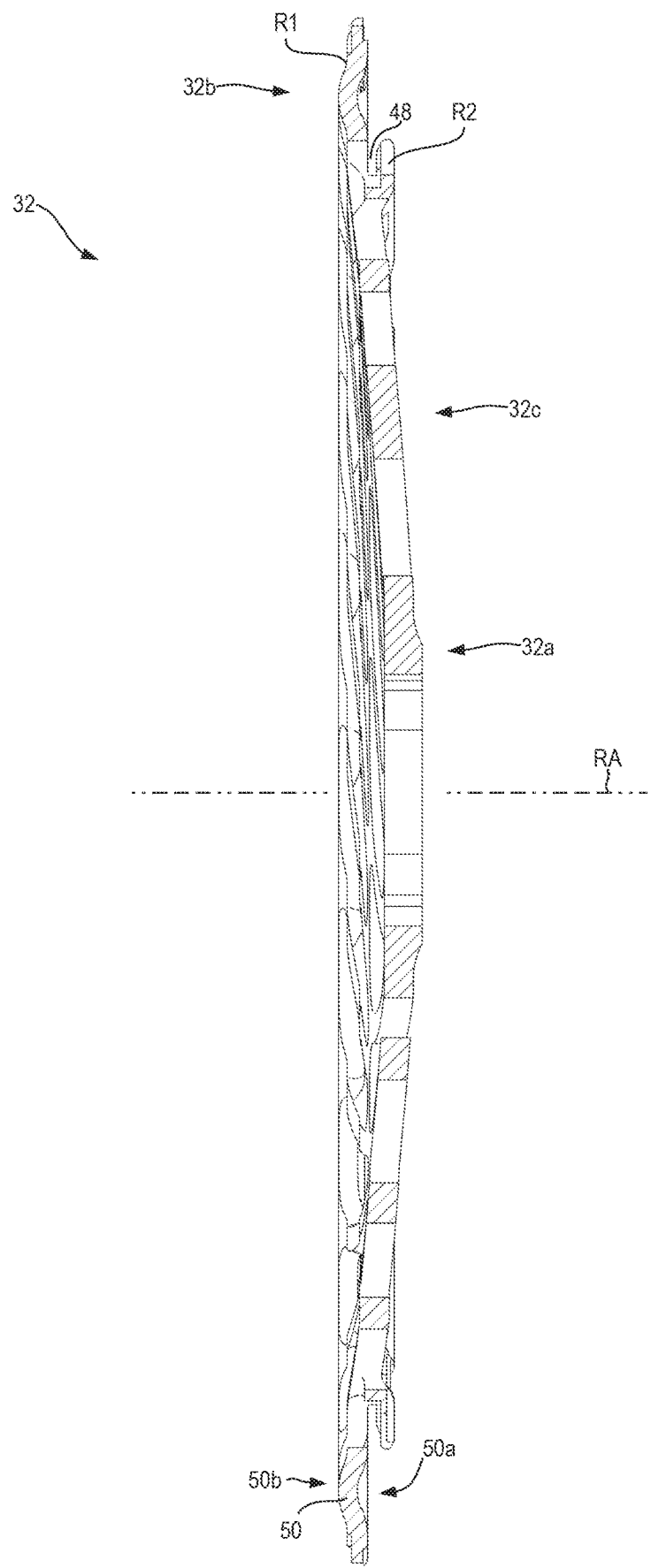
FIG. 8 shows a sectional view of the first partial arrangement from FIG. 7.

The sectional plane of FIGS. 4 and 8 does not run through that circumferential position at which an outer sprocket spoke 40 and an axially thicker tooth 46a of the second largest sprocket R2 lie axially opposite each other. Nevertheless, FIGS. 4 and 8 show that the width of the axial gap 48 between an outer sprocket spoke 40 and a tooth 46a of the sprocket R2 is small enough to accommodate the bicycle chain 28 with little axial movement when it is in positive-locking engagement with the sprocket R2.

As shown in FIGS. 4 and 8, the toothed region 32b of the largest sprocket R1 includes an annular axial bead 50 on the outboard side of the sprocket R1 in order to reinforce said sprocket R1. The largest sprocket R1 therefore has a depression 50a on its outboard side. On the axially inboard side of sprocket R1, the annular axial bead 50 comprises a protrusion 50b. The axial bead 50 is radially located in a reinforcing region 51 between the root radii of the first sprocket R1 and the second sprocket R2, for example even between the tip radius of the second sprocket R2 and the root radius of the first sprocket R1.

Figure 11:
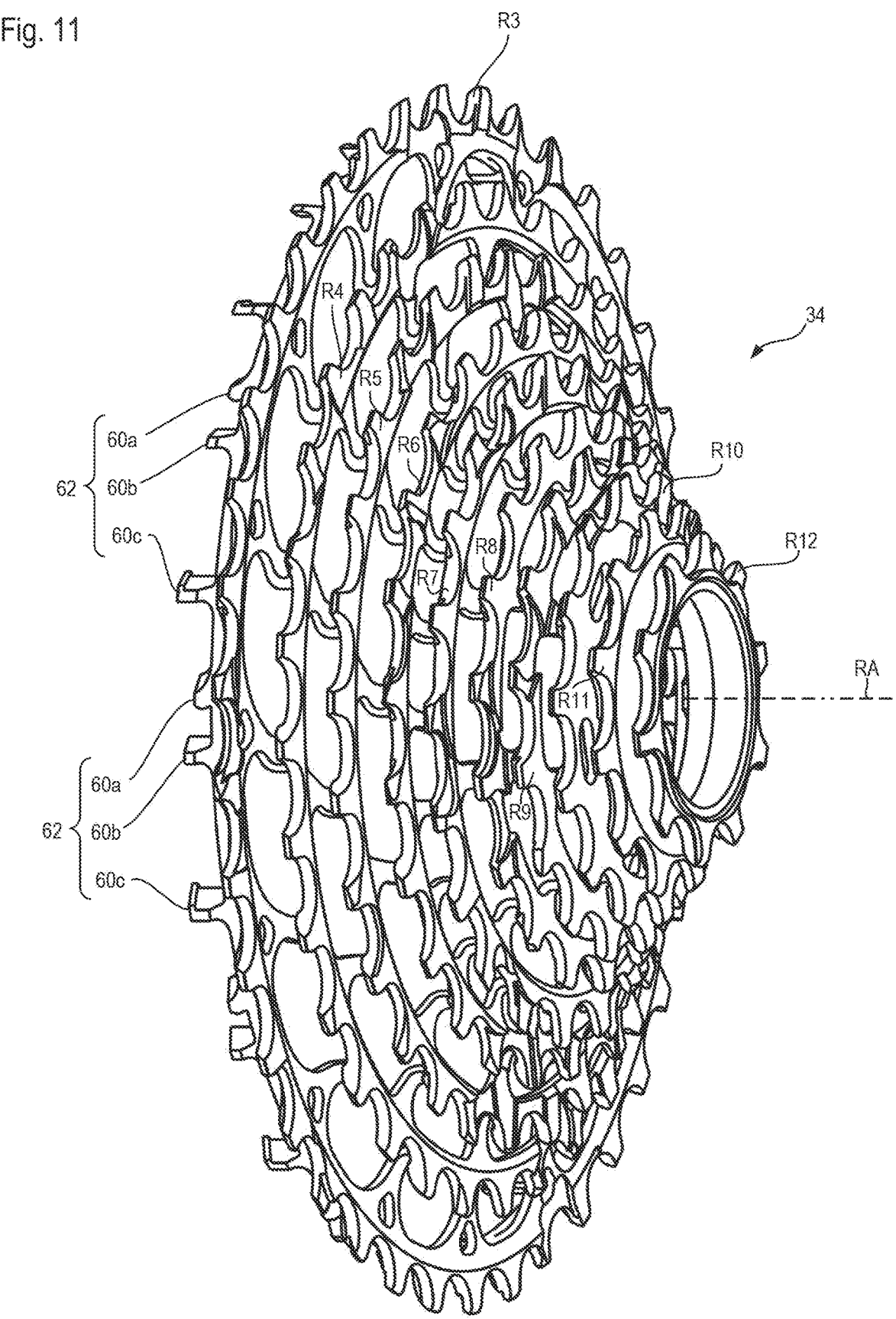
FIG. 11 shows an oblique outboard perspective view of the second partial arrangement of the sprocket arrangement.
Figure 12:
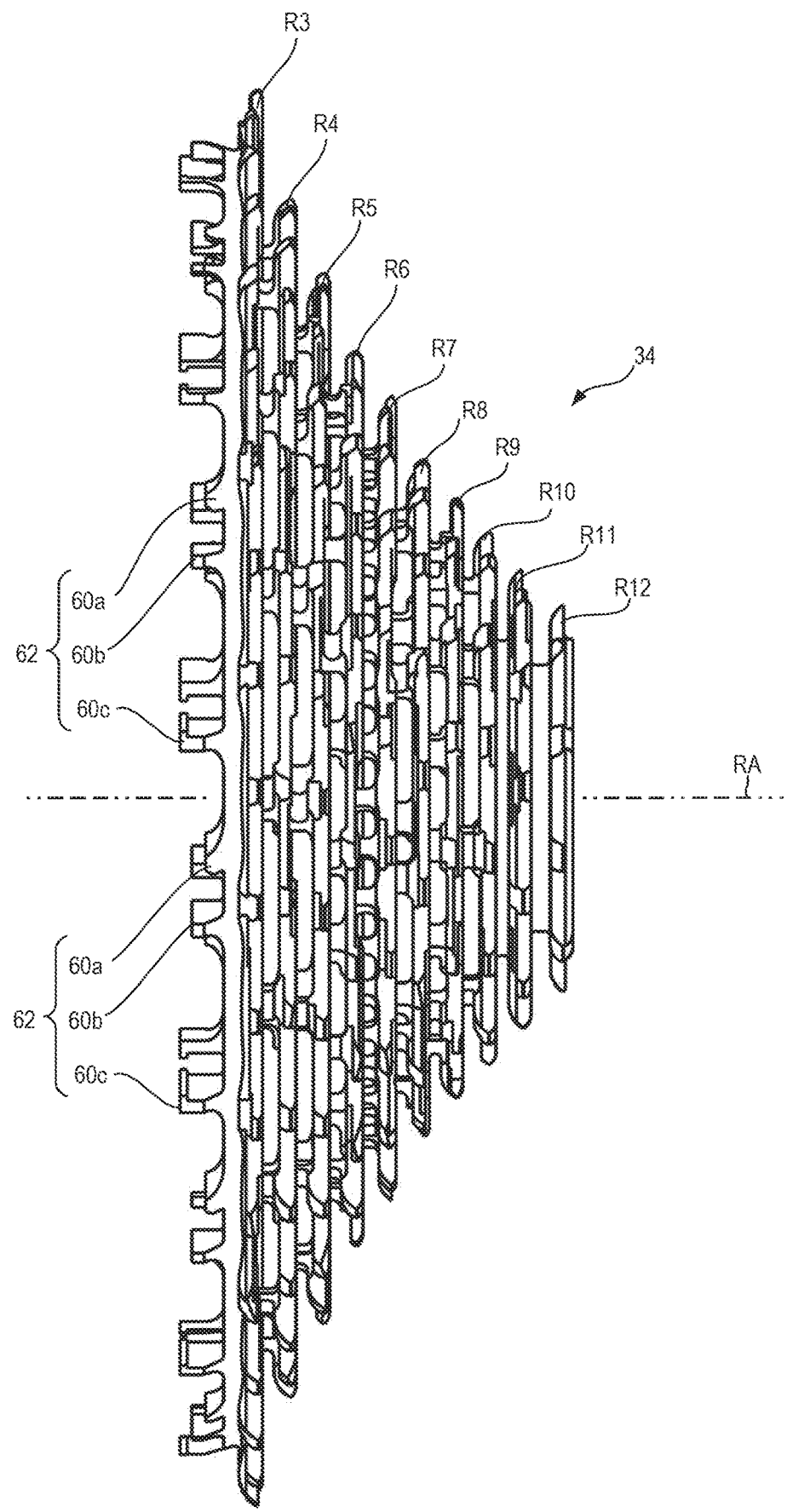
FIG. 12 shows a side view of the second partial arrangement.
Figure 13:
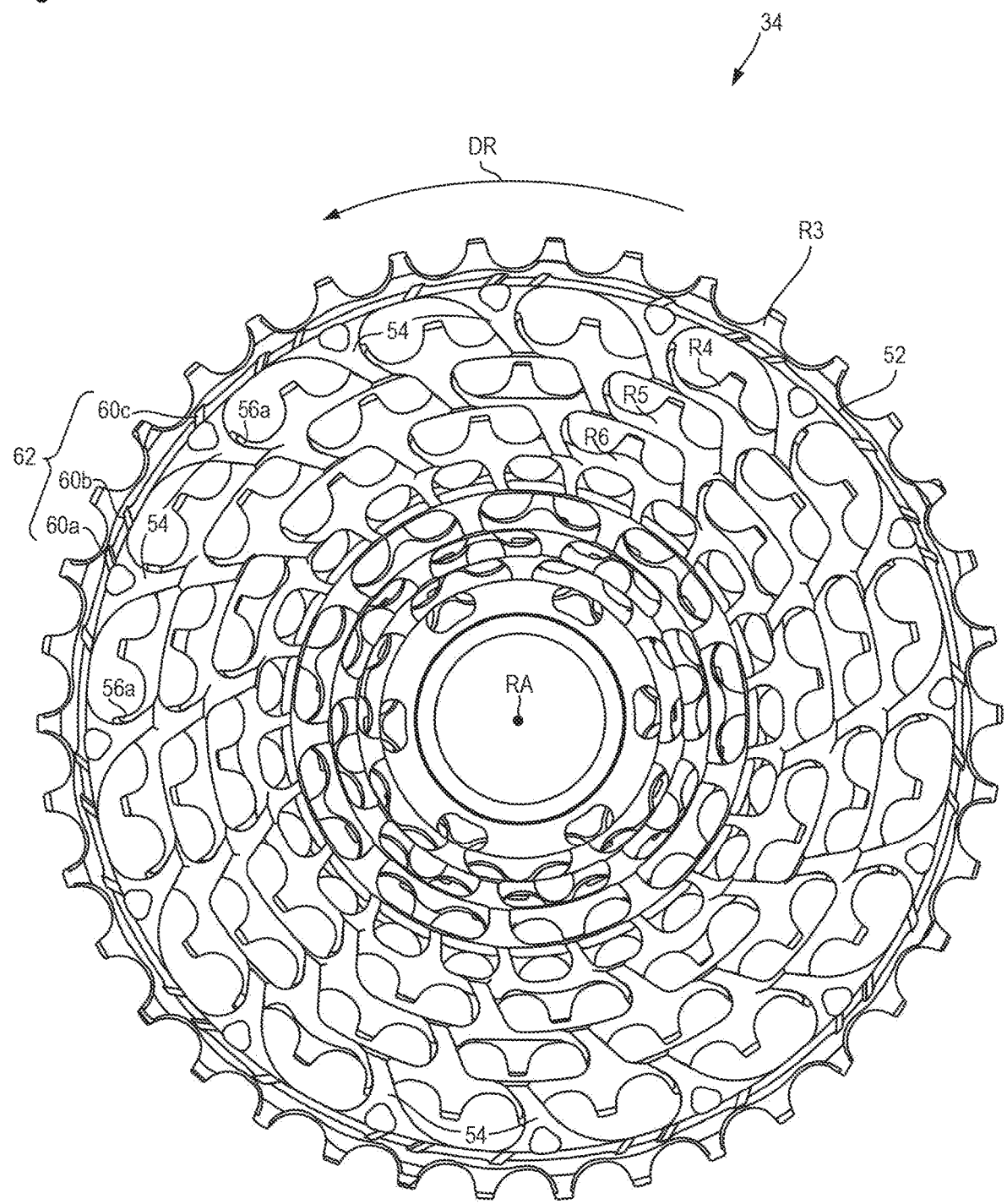
FIG. 13 shows an inboard axial view of the second partial arrangement.

FIGS. 11 to 13 show only the second partial arrangement 34. FIG. 11 shows an oblique outboard perspective view of the second partial arrangement 34. FIG. 12 shows a side view of the second partial arrangement 34. FIG. 13 shows an inboard axial view of the second partial arrangement 34.

FIG. 13 shows the integral formation of the second partial arrangement 34. Each sprocket from R3 to at least R9 includes sprocket teeth and radially-inwardly-protruding webs that integrally connect a sprocket to the next smaller axially adjacent sprocket.

Only the toothed rim of the largest sprocket R3 is denoted by the reference symbol 52 and the webs protruding radially inwards from sprocket R3 toward the next smaller sprocket R4 are denoted by reference symbol 54. The webs 54 do not extend radially inwardly beyond the next smallest sprocket R4, with which they are directly integrally formed.

In an embodiment, all sprockets have an even number of teeth, except sprocket R7, which has 21 teeth. For each pair of adjacent sprockets for which the smaller sprocket has an even number of teeth, every other tooth of the smaller sprocket circumferentially aligns with the position of a web. This is shown in FIG. 13 for the sprocket pairing R3/R4. There are half as many webs 54 connecting larger sprocket R3 to smaller sprocket R4 as there are teeth on the smaller sprocket R4. Every other tooth of the smaller sprocket is therefore accessible from both axial sides of the second partial arrangement 34.

The teeth 56a that are located at the same circumferential position as webs 54 are axially thicker than the teeth 56b lying circumferentially between them. Because the teeth 56a, where webs 54 connect, are thicker, the integral connection of sprockets R3 and R4 is made stable and the width of the gap 58 between a tooth 56a and an adjacent web 54 can be made relatively small. The axial gap 58 can then axially accommodate the bicycle chain 28 with little movement when said bicycle chain is in positive-locking engagement with the sprocket R4.

This arrangement does not apply to the sprocket pair R6 and R7 because of the uneven number of teeth of the sprocket R7. Instead, there is a web integrally connecting sprockets R6 and R7 at each circumferential position of a tooth of the sprocket R7. Because there are more webs, they need not be as circumferentially wide as the webs connecting other sprocket pairs.

FIG. 13 also shows that the webs are angled in the circumferentially opposite direction of the sprocket spokes 38 and 40 of the first partial arrangement. The webs connecting the sprockets of the second partial arrangement 34 are angled such that their radially inner end trails the radially outer end in the driving direction of rotation DR. Accordingly, the radially outer end precedes the radially inner end in the driving direction of rotation DR. This is load-appropriate since the sprockets R3 to R12 of the second partial arrangement 34 transmit torque from the bicycle chain 28 to the first partial arrangement 32 to the hub region 32a and finally to the rear wheel hub.

As FIGS. 11 to 13 show, three structurally different types of axial projections 60a, 60b and 60c protrude from the toothed rim 52 of the largest sprocket R3 of the second partial arrangement 34 towards the first partial arrangement 32. In each case a combination of an axial projection 60a, 60b and 60c forms a projection group 62 which engages a portion 64 of the outer sprocket spokes 40. The portion 64, which is also a fixing portion, such as a stop portion and mating stop portion, completely encircles the sprocket rotation axis RA in the circumferential direction. Because it acts as a fixing portion, as a stop portion, and also as a mating stop portion, the portion 64 is referred to below as the "engagement portion." For simplicity, the reference symbols 64 shown in the figures are placed only on some outer sprocket spokes 40 in order to identify the corresponding engagement portion of the projection groups 62 on the first partial arrangement 32.

The projection groups 62 are distributed in the circumferential direction about the sprocket rotation axis RA over the entire extent of the sprocket 52, and therefore the sprocket 52 and the second partial arrangement 34 are connected uniformly to the first partial arrangement 32 over the entire extent of the sprocket 52.

Figure 16:
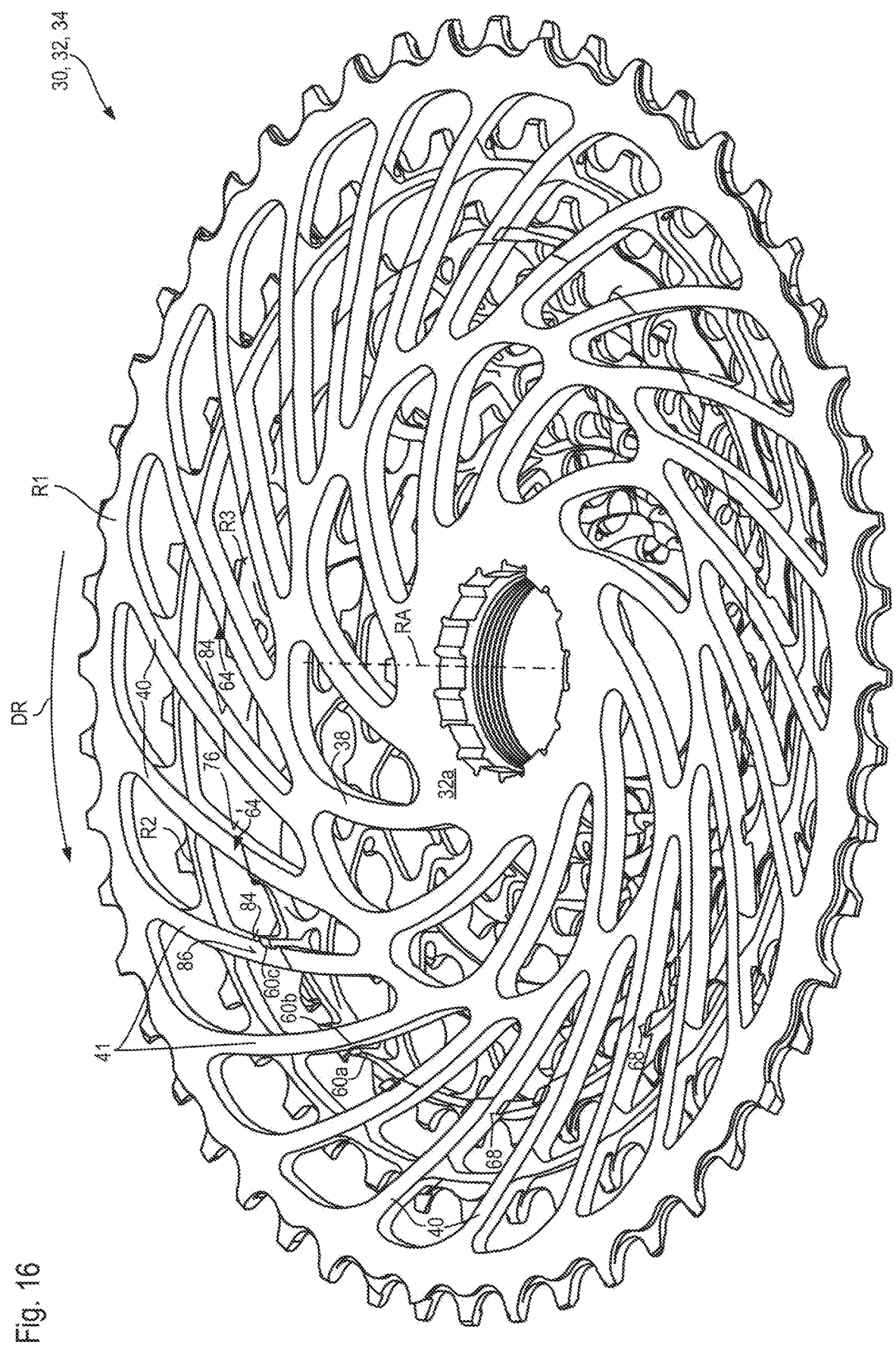
FIG. 16 shows an oblique inboard perspective view of the sprocket arrangement including the two partial arrangements.

FIG. 16 shows how the axial projections 60a, 60b and 60c engage the outer sprocket spokes 40 of the first partial arrangement 32 in order to connect the first and the second partial arrangements 32 and 34 to each other for joint rotation in an axially immovable manner. The axial projections 60a, 60b and 60c are repeated periodically in the circumferential direction.

Figure 14:
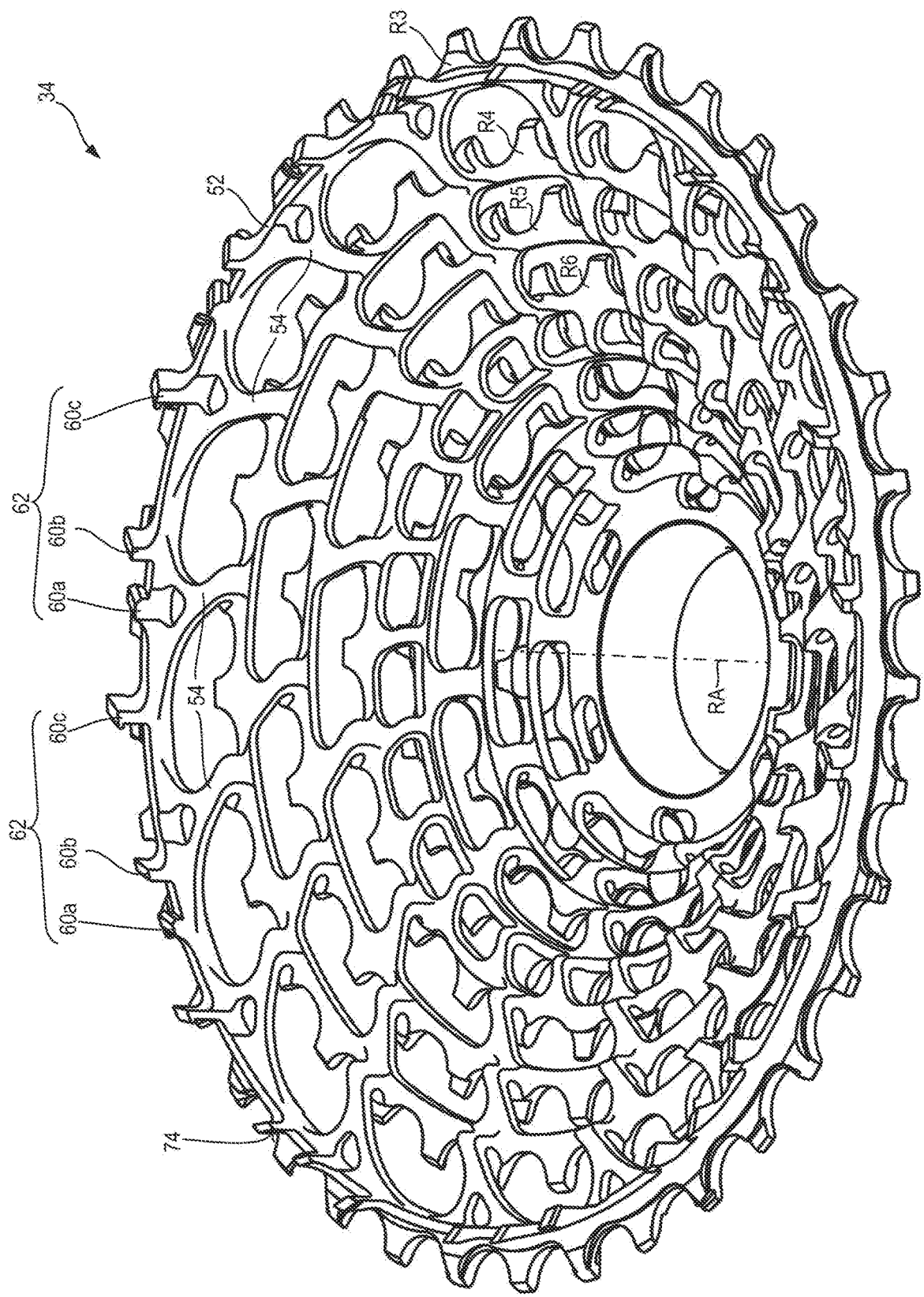
FIG. 14 shows an oblique inboard perspective view of the second partial arrangement.
Figure 15:
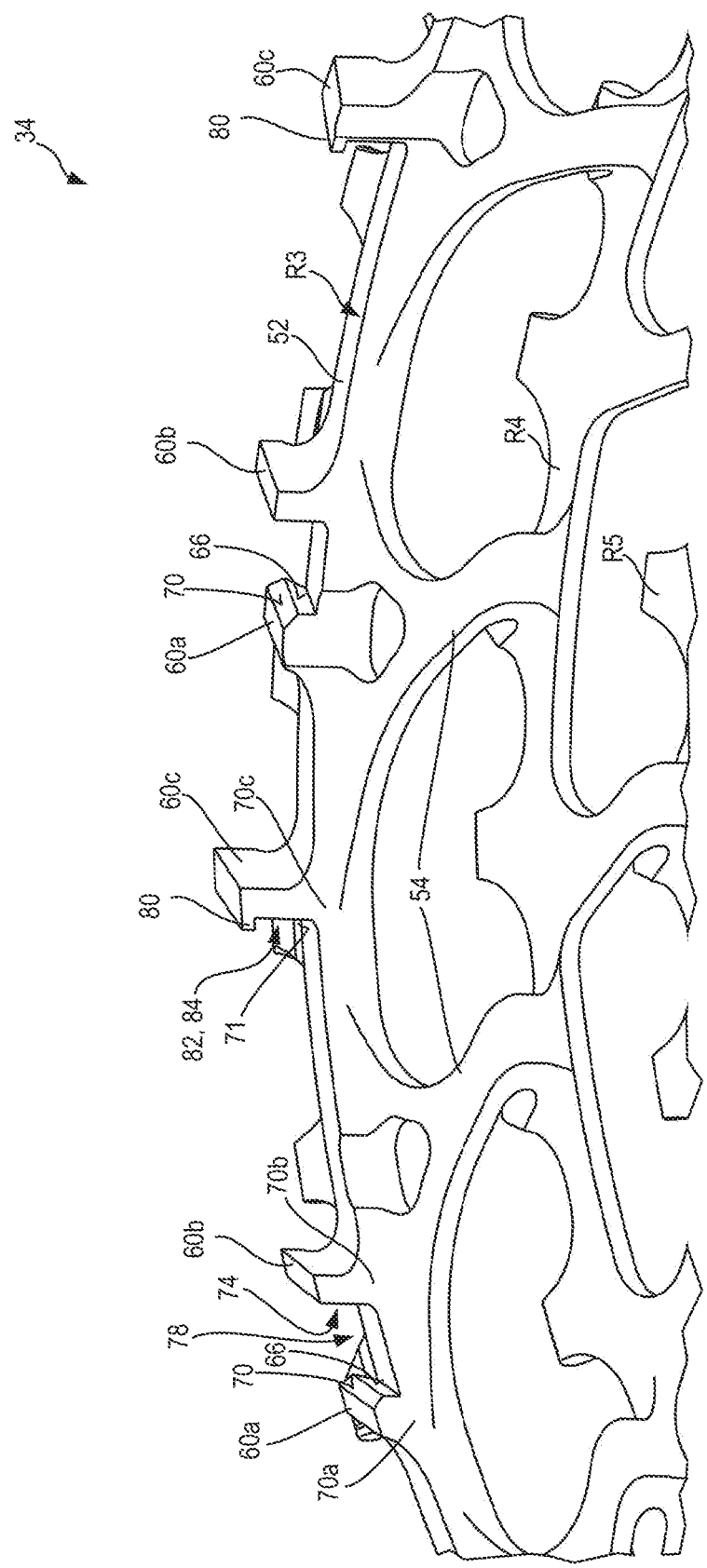
FIG. 15 shows an enlarged view of a region of the two largest sprockets of the second partial arrangement from FIG. 14.

FIGS. 14 to 16 illustrate the latching connection between the partial arrangements 32 and 34. FIG. 14 shows an oblique inboard perspective view of the second partial arrangement 34. FIG. 15 shows an enlarged view of a region of the two largest sprockets R3 and R4 of the second partial arrangement 34 from FIG. 14. FIG. 16 shows an oblique inboard perspective view of the sprocket arrangement 30, including the two partial arrangements 32 and 34.

The axial projection 60a is axially shorter than the two other types of axial projections 60b and 60c. The axial projection 60a is a mating stop projection, the mating stop surface 66 of which abuts a lateral boundary surface 68 in the engagement portion 64 of an outer sprocket spoke 40 (thus functioning as a mating stop portion).

The lateral boundary surface 68 of the engagement portion 64, which abuts the mating stop surface 66, is inclined by approximately 45° relative to a reference plane containing the sprocket rotation axis RA. Therefore, due to the contact engagement between the mating stop surface 66 and the lateral boundary surface 68, forces acting both in the circumferential and radial directions can be transmitted between the sprocket spoke 40 and axial projection 60a.

In addition, the axial projection 60a includes an oblique surface 70 which is inclined such that a body which moves thereon and axially approaches the root region 70a of the axial projection 60a on the toothed rim 52 approaches the mating stop surface 66 both in the radial direction and in the circumferential direction of.

The axial projection 60b is a stop projection, the stop surface 74 of which, facing in the opposite direction of mating stop surface 66 of a projection 60a, serves exclusively for contact engagement with a lateral boundary surface 76 in the engagement portion 64 of an outer sprocket spoke 40 (thus functioning as a stop portion). The boundary surface 76 faces in the opposite direction of boundary surface 68. The boundary surface 76 is therefore also inclined by approximately 45° relative to the reference plane containing the sprocket rotation axis RA. Due to the contact engagement between the stop surface 74 and the boundary surface 76, forces in both the radial and circumferential directions can be transmitted between the axial projection 60b and the outer sprocket spoke 40.

Stop surface 74 and mating stop surface 66 delimit a receiving space 78 in which an outer sprocket spoke 40 is received. The distance between the mating stop surface 66 and the stop surface 74 of the same projection group 62 substantially corresponds to the thickness of the outer sprocket spoke 40, which effectively eliminates play movement of the sprocket spoke 40 in a direction orthogonal to the sprocket rotation axis when it is situated in the receiving space 78. The oblique surface 70 facilitates insertion of outer sprocket spoke 40 into the receiving space 78.

The plurality of mating stop projections 60a and stop projections 60b of the second partial arrangement 34 therefore fixes the two partial arrangements 32 and 34 relative to each other in the radial and circumferential directions.

The axial projection 60c is an axial fixing projection. It has a latching lug 80, which protrudes from axial projection 60c in both the circumferential and radial directions relative to sprocket rotation axis RA.

The area between latching lug 80 and outer surface 71 of the root region 70c, which faces the latching lug 80, defines holding space 82. The size of holding space 82 in the axial direction substantially corresponds to the axial thickness of the engagement portion 64 of an outer sprocket spoke 40 such that any axial movement of the outer sprocket spoke 40 when it is received by holding space 82 is eliminated.

The plurality of axial projections 60c immovably fixes the two partial arrangements 32 and 34 to each other in the axial direction. The oblique surfaces 66 of the mating stop projections 60a also facilitate insertion of the engagement portion 64 of an outer sprocket spoke 40 into the holding spaces 82 of the axial fixing projections 60c.

The axial projection 60c also functions as a stop projection due to stop surface 84 [FIG. 15], which is oriented between the latching lug 82 and the outer surface 71 of the root region 70c. Stop surface 84 [FIG. 15] abuts lateral boundary surface 84 [FIG. 16] of an outer sprocket spoke 40. By contrast, the latching lug 82 abuts an end-side boundary surface 86 of an outer sprocket spoke 40.

The axial projections 60c thus comprise latching formations of the second partial arrangement 34 that engage mating latching formations, comprising the engagement portion 64 of outer sprocket spokes 40, resulting in a virtually inseparable latching engagement.

A single projection group 62 engages a spoke group 41, which includes two circumferentially adjacent outer sprocket spokes 40, to reduce or to limit the force exerted on an individual sprocket spoke 40.

To ensure sufficient elasticity in the engagement portion 64 of outer sprocket spokes 40 to enable first and second partial arrangements 32 and 34 to actually be mechanically connected, each engagement portion 64 is configured to occupy the central region spanning the midpoint between the two longitudinal ends of each outer sprocket spoke 40. The length of said central region is no more than a third, for example no more than a quarter of the entire length of the sprocket spoke 40.

Figure 17:
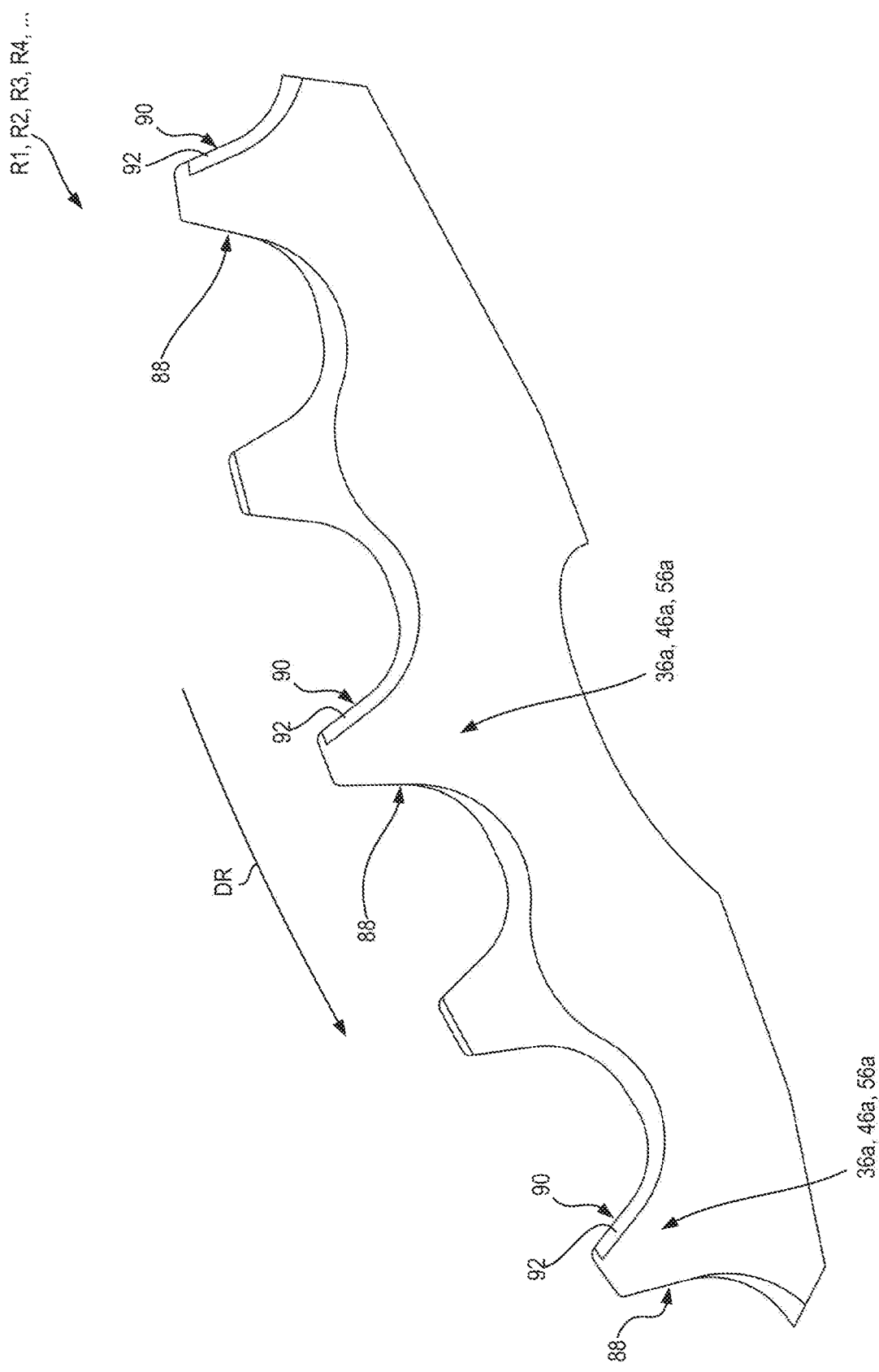
FIG. 17 shows an inboard axial view of the radially outermost portion of any sprocket of the sprocket arrangement, with the exception of the smallest sprocket.

FIG. 17 illustrates the configuration of the axially thicker teeth of sprockets R1 to R6 and R8 to R11, including the previously-mentioned teeth 36a, 46a and 56a.

FIG. 17 shows the inboard side of any sprocket R1 to R6 and R8 to R11, which faces in the direction of the longitudinal center plane of the bicycle 10. For all sprockets except the largest sprocket R1, the side shown in FIG. 17 faces in the direction of the next largest sprocket.

The axially thicker teeth, denoted by symbols 36a, 46a or 56a, begin at a common tooth flank 88, which precedes in the driving direction of rotation DR, and have an approximately constant axial thickness and radial position in the circumferential direction. However, the lateral tooth flank (facing the viewer in FIG. 17) is shorter in the circumferential direction than the opposite lateral tooth flank (facing away from the viewer in FIG. 17). An axial step 92, for which the axial thickness of the tooth is abruptly reduced, is formed on the lateral tooth flank facing the viewer in the region of the tooth flank 90, which trails in the driving direction of rotation DR. The axial step 92 is a step in a direction away from the viewer in FIG. 17.

The circumferential width of the axially thicker teeth 36a, 46a or 56a on the side facing the viewer of FIG. 17 is therefore shorter than on the opposite side. The axially thicker teeth 36a, 46a or 56a therefore have a roughly L-shaped cross section.

The axial step 92 acts a recess which spatially accommodates an outer link plate of the bicycle chain 28.

Figure 18:
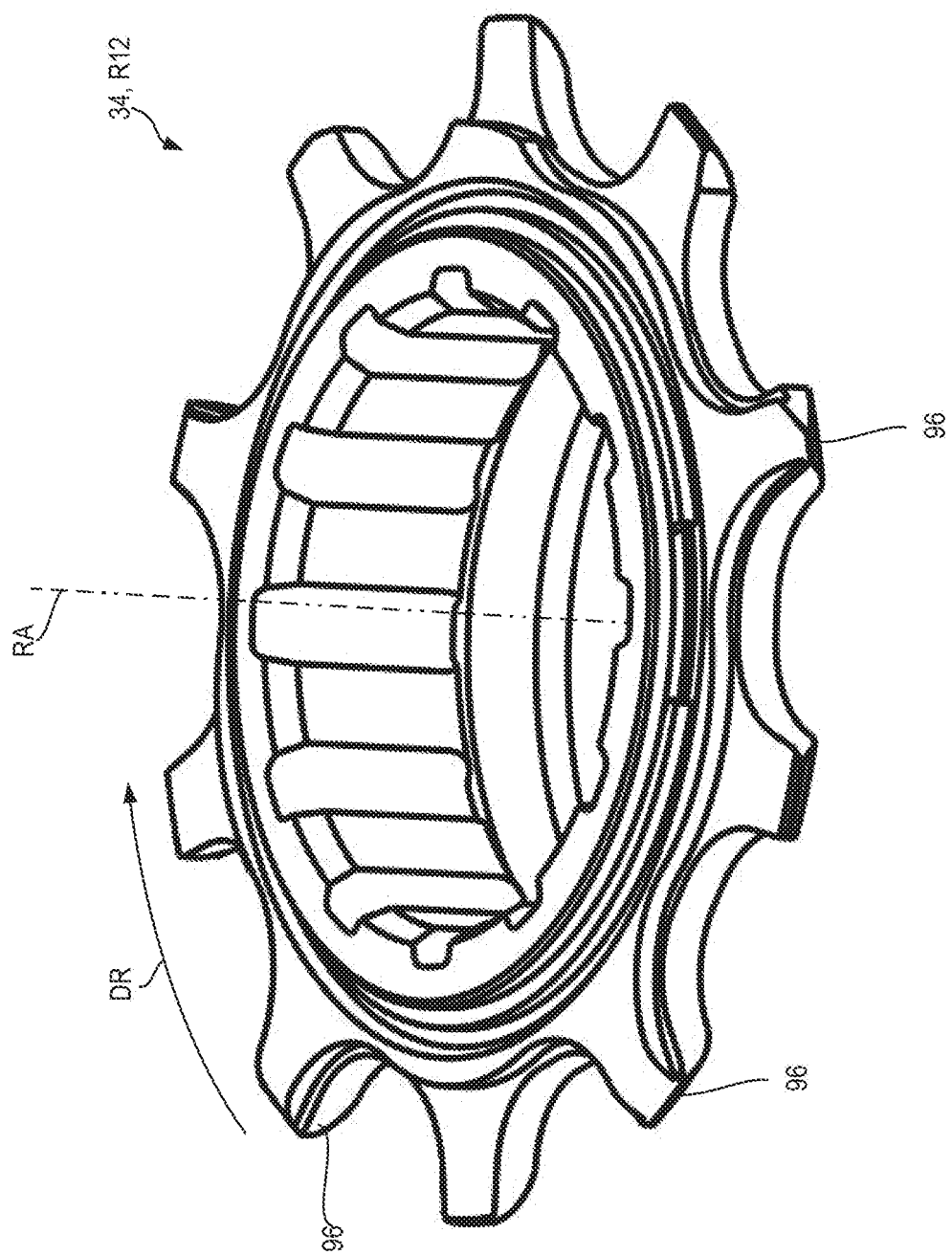
FIG. 18 shows an oblique outboard perspective view of the smallest sprocket of the sprocket arrangement.

FIG. 18 shows an oblique outboard perspective view of the smallest sprocket R12 of the sprocket arrangement 30. Since the chain 28 has a particularly pronounced skew relative to the longitudinal center plane of the bicycle 10 when it is in engagement with the smallest sprocket R12, the axially thicker teeth 96 on the smallest sprocket R12 have a different configuration than the axially thicker teeth of the other sprockets (with the exception of sprocket R7).

The circumferential width of the lateral tooth flank on the inboard side of smallest sprocket R12 is greater than the circumferential width of the lateral tooth flank on the outboard side. The lateral tooth flank on the outboard side faces the viewer in FIG. 18.

The lateral tooth flank on the inboard side of smallest sprocket R12 extends circumferentially beyond the lateral tooth flank on the outboard side on both sides. The axially thicker teeth 96 of the smallest sprocket R12 therefore has a roughly T-shaped circumferential cross section.

The following examples are intended to characterize some of the embodiments of the sprocket arrangement:

1. An embodiment of a bicycle rear wheel sprocket arrangement (30), which is rotatable about a common sprocket rotation axis (RA) that defines an axial direction and orthogonal to which are radial directions, comprises a plurality of sprockets (R1-R12) of different sizes and number of teeth arranged coaxially along the sprocket rotation axis (RA) and which are connected to one another for joint rotation about the sprocket rotation axis (RA), wherein the sprocket arrangement (30) includes a first partial arrangement (32), comprising the largest sprocket (R1), and a second partial arrangement (34), comprising a plurality of sprockets (R3-R12) formed integrally with one another, and wherein one partial arrangement (34) out of the first and second partial arrangements (32, 34) has a plurality of elastically deformable latching formations (60c) that are in latching engagement with a plurality of mating latching formations of the respective other partial arrangement (32) such that the latching engagement prevents the two partial arrangements (32, 34) from separating in the axial direction.

2. An embodiment of a bicycle rear wheel sprocket arrangement (30) such as that of Example 1, wherein the latching formations (60c) and/or the mating latching formations are formed integrally with their respective partial arrangements (32, 34).

3. An embodiment of a bicycle rear wheel sprocket arrangement (30) such as that of Example 1 or 2, wherein the latching formations (60c) comprise axial fixing projections (60c) that protrude axially from the partial arrangement (34), each of which having a latching lug (80) that protrudes in either the radial or circumferential direction, the latching lug configured at an axial distance from a root region (70*c*) from which the axial projections (60*c*) protrude from the partial arrangement (34).

4. An embodiment of a bicycle rear wheel sprocket arrangement (30) such as that of Example 3, wherein at least one, but in an example all, axial fixing projections (60*c*) hold a fixing portion (64) of the mating latching formations in a holding space (84), which is bounded in one axial direction by the latching lug (80) and in the opposite axial direction by a holding formation (71), preferably the root region (70*c*), the holding formation (71) extending parallel to and being an axial distance from the latching lug (80).

5. An embodiment of a bicycle rear wheel sprocket arrangement (30) such as that of Example 3 or 4, wherein the axial fixing projections (60*c*) are rigid in the axial direction and deformable in an orthogonal direction relative to the sprocket rotation axis (RA).

6. An embodiment of a bicycle rear wheel sprocket arrangement (30) such as that of one of the preceding Examples, wherein axial projections (60*b*, 60*c*) act as stop projections (60*b*, 60*c*) with a stop surface (74, 82) which faces in a direction of action with a direction component orthogonal to the sprocket rotation axis (RA), orthogonally to the sprocket rotation axis (RA), and abuts a stop portion (76, 84) of a mating stop formation, for example a stop portion of a mating latching formation.

7. An embodiment of a bicycle rear wheel sprocket arrangement (30) such as that of Example 6, wherein axial projections (60*a*) act as mating stop projections (60*a*) with a mating stop surface (66) that faces in an opposite direction of action with a direction component orthogonal to the sprocket rotation axis (RA) preferably orthogonally to the sprocket rotation axis (RA), and abuts a mating stop portion (68) of a mating stop formation, in particular of a mating latching formation, wherein the radial and/or circumferential direction components of corresponding stop surfaces and mating stop surfaces face in opposite directions.

8. An embodiment of a bicycle rear wheel sprocket arrangement (30) such as that of Example 7, wherein at least some, but preferably all of the mating stop projections (60*a*) have an oblique surface (70) at their freely projecting longitudinal end, and the mating stop surface (66) is situated axially between the oblique surface (70) and a root region (70*a*), and wherein the oblique surface (70) is inclined such that a body moving axially in the direction toward the root region (70*a*) that makes contact with it deflects in the radial and/or circumferential direction toward the mating stop surface (66).

9. An embodiment of a bicycle rear wheel sprocket arrangement (30) such as that of Bicycle rear wheel sprocket arrangement (30) according one of Example 3 to 8, and including Example 6, wherein at least some, but preferably all of the axial fixing projections (60*c*) also serve as stop projections.

10. An embodiment of a bicycle rear wheel sprocket arrangement (30) such as that of one of Examples 3 to 9, including Examples 3, 6 and 7, wherein the axial projections (60*a*, 60*c*) form a plurality of projection groups (62), each of which having at least one axial fixing projection (60*c*) and a mating stop projection (60*a*).

11. An embodiment of a bicycle rear wheel sprocket arrangement (30) according to the preamble of Example 1 or according to one of the preceding Examples 1 to 10, wherein the mating latching formations comprise a plurality of sprocket spokes (38, 40) that connect a radially inner hub region (32*a*), which transmits torque from the sprocket arrangement (30) to a rear wheel hub, to a radially outer toothed rim region (32*b*), which transmits force between a bicycle chain (28) and the sprocket arrangement (30).

12. An embodiment of a bicycle rear wheel sprocket arrangement (30) such as that of Example 11, wherein there are fewer radially inner spokes (38) than radially outer spokes (40), wherein the outer spokes (40), and preferably only the outer spokes (40), serve as the mating latching formations.

13. An embodiment of a bicycle rear wheel sprocket arrangement (30) such as that of Example 11 or 12, including Example 10, wherein the sprocket spokes (38, 40) are arranged as a plurality of spoke groups (41), each including at least two sprocket spokes (40), wherein each spoke group (41) engages a projection group (62).

14. An embodiment of a bicycle rear wheel sprocket arrangement (30) such as that of Example 13, wherein circumferentially adjacent sprocket spokes (40), and preferably exactly two adjacent sprocket spokes (40), comprise a spoke group (41).

15. An embodiment of a bicycle rear wheel sprocket arrangement (30) such as that of one of Examples 11 to 14, wherein the sprocket spokes (38, 40) have both a radial and a circumferential dimension such that a radially outer end of a spoke (38, 40) trails a radially inner end of the same spoke (38, 40) relative to the driving direction of rotation (DR), and wherein sprocket spokes (38, 40) are curved convexly when viewed opposite the driving direction of rotation (DR).

16. An embodiment of a bicycle rear wheel sprocket arrangement (30) such as that according to the preamble of Example 1 or according to one of the preceding Examples 1 to 15, wherein the first partial arrangement (32) comprises the largest sprocket (R1) and the second largest sprocket (R2), and wherein the largest sprocket (R1) and the second largest sprocket (R2) are formed integrally with each other.

17. An embodiment of a bicycle rear wheel sprocket arrangement (30) such as that of Example 16, wherein the first partial arrangement (32) includes an annular axial bead (50), in a radial reinforcing region (51) between the root radii of the largest sprocket (R1) and the second largest sprocket (R2), and which is configured as an axial depression (50*a*) on the outboard side of the reinforcing region (51).

18. An embodiment of a bicycle rear wheel sprocket arrangement (30) such as that of Example 16 or 17, including one of Examples 11 to 15, wherein the radially outer sprocket spokes (40) extend radially outward as far as the toothed rim region (32*b*) of the largest sprocket (R1), and wherein there are half as many radially outer sprocket spokes (40) as there are teeth on the second largest sprocket (R2).

19. An embodiment of a bicycle rear wheel sprocket arrangement (30) such as that of Example 18, wherein each sprocket spoke (40) and every other tooth (46*a*) of the second largest sprocket (R2) circumferentially align when viewing the first partial arrangement (32) from an axial direction.

20. An embodiment of a bicycle rear wheel sprocket arrangement (30) such as that of Example 19, wherein the teeth (46*a*) of the second largest sprocket (R2) that circumferentially align with sprocket spokes (40) are axially thicker than the circumferentially adjacent teeth (46*b*).

21. An embodiment of a bicycle rear wheel sprocket arrangement (30) such as that according to the preamble of Example 1 or according to one of the preceding Examples 1 to 20, wherein the second partial arrangement (34) includes between 6 and 12 axially consecutive sprockets (R3-R12) formed integrally with one another.

22. An embodiment of a bicycle rear wheel sprocket arrangement (30) such as that of Example 21, wherein the second partial arrangement (34) comprises the third largest sprocket (R3) of the sprocket arrangement (30).

23. An embodiment of a bicycle rear wheel sprocket arrangement (30) such as that of Example 21 or 22, wherein the second partial arrangement (34) comprises the smallest sprocket (R12).

24. An embodiment of a bicycle rear wheel sprocket arrangement (30) such as that of one of Examples 21 to 23, wherein for at least one, but preferably all pairs of adjacent sprockets of the second partial arrangement (34) are connected by integrally-formed webs (54) such that there are fewer webs (54) than there are teeth on the smaller sprocket of the pair.

25. An embodiment of a bicycle rear wheel sprocket arrangement (30) such as that of Example 24, wherein the number of webs (54) connecting a pair of axially adjacent sprockets shares a common integer factor with the number of teeth of the smaller sprocket of the pair.

26. An embodiment of a bicycle rear wheel sprocket arrangement (30) such as that of Example 24 or 25, wherein a pair of axially adjacent sprockets are integrally connected to one another and each connecting web (54) is circumferentially oriented to align with a tooth on the smaller sprocket of the sprocket pair.

27. An embodiment of a bicycle rear wheel sprocket arrangement (30) such as that of one of Examples 24 to 26, wherein there are half as many webs (54) as there are teeth on the smaller sprocket of a sprocket pair provided that there are an even number of teeth on said smaller sprocket.

28. An embodiment of a bicycle rear wheel sprocket arrangement (30) such as that of Example 27, wherein, for at least one, but preferably all pairs of connected adjacent sprockets for which the smaller sprocket of the pair has an even number of teeth, each web (54) circumferentially aligns with every other tooth (56a) on the smaller sprocket of a sprocket pair when the second partial arrangement (34) is viewed in the axial direction.

29. An embodiment of a bicycle rear wheel sprocket arrangement (30) such as that of Example 26 or according to Example 28, wherein the teeth (56a) of the smaller sprocket of a sprocket pair that circumferentially align with the connecting webs (54) are axially thicker than the circumferentially adjacent teeth (56b).

30. An embodiment of a bicycle rear wheel sprocket arrangement (30) such as that of one of the preceding Examples, wherein the sprocket arrangement (30) includes between eight and fourteen sprockets (R1-R12), and wherein the smallest sprocket (R12) has no more than twelve, but preferably no more than ten, and ideally precisely ten teeth and/or the largest sprocket (R1) has no fewer than 50, but preferably no fewer than 52, and ideally precisely 52 teeth.

31. An embodiment of a bicycle rear wheel sprocket arrangement (30) such as that of one of the preceding Examples, wherein a plurality of, but preferably all sprockets (R1-R6, R8-R12) with an even number of teeth have circumferentially alternating axially thicker teeth (36a, 46a, 56a) and axially thinner teeth (36b, 46b, 56b).

32. An embodiment of a bicycle rear wheel sprocket arrangement (30) such as that according to the preamble of Example 1 or according to one of the preceding Examples 1 to 31, wherein the smallest sprocket has circumferentially alternating axially thicker and thinner teeth along at least part, but preferably along the entire circumference of the sprocket, wherein lateral tooth flanks on the inboard side of the axially thicker and the axially thinner teeth are configured along a common virtual enveloping surface, wherein starting from the common enveloping surface, the axially thicker teeth extend axially further outboard than the axially thinner teeth.

33. An embodiment of a bicycle rear wheel sprocket arrangement (30) such as that of Example 32, wherein for a plurality, but preferably for all of the axially thicker teeth of the smallest sprocket, the inboard lateral tooth flank is circumferentially wider than the flank on the outboard side of the tooth such that both circumferential edges of the inboard flank extend circumferentially beyond the circumferential edges of the outboard flank.

34. An embodiment of a bicycle rear wheel sprocket arrangement (30) such as that of Example 33, wherein at least one, but preferably a plurality, and ideally all of the axially thicker teeth include at least one, and ideally only one step from the circumferentially wider inboard tooth flank to the circumferentially narrower outboard tooth flank, on at least one, but preferably on both circumferential sides of the tooth.

35. An embodiment of a bicycle drive assembly (12) consisting of a bicycle chain (28), having rollers connected to one another by alternating outer and inner pairs of link plates (28a, 28b), and of a bicycle rear wheel sprocket arrangement (30), which can be brought into driving-force-transmitting, positive-locking engagement with the bicycle chain (28), according to one of the preceding Examples including Example 29, wherein the axially thicker teeth (36a, 46a, 56a) are axially thicker than the gap between the inner link plate pairs (28b) is wide, which ensures that the axially thicker teeth (36a, 46a, 56a) can only engage the bicycle chain in the gaps between the pairs of outer link plates.

36. An embodiment of a bicycle drive assembly (12) such as that of Example 35, wherein at least some of the sprockets (R2-R6, R8-R12), particularly those with an even number of teeth, engage the bicycle chain (28) in a force-transmitting positive-locking manner such that a web (54) or a sprocket spoke (40) lies axially inboard of at least a plurality of outer link plates, but preferably inboard of all of the outer link plates, of a portion of the chain (28) that is in positive-locking engagement with the sprocket (R2-R6, R8-R12).

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A bicycle rear wheel sprocket arrangement which is rotatable about a common sprocket rotation axis that defines an axial direction and orthogonal to which are radial directions, comprising:
 a plurality of sprockets of different sizes and number of teeth arranged coaxially along the sprocket rotation axis, which are connected to one another such that the sprockets jointly rotate about the sprocket rotation axis together,
 wherein the sprocket arrangement comprises:
  a first partial arrangement that includes a largest sprocket, and
  a second partial arrangement that includes a plurality of sprockets formed integrally with one another, wherein one partial arrangement has a plurality of elastically deformable latching formations that are in latching engagement with a plurality of mating latching formations of the other partial arrangement to prevent the two partial arrangements from separating in the axial direction.

2. A bicycle rear wheel sprocket arrangement according to claim 1, wherein mating latching formations, embodied by a plurality of sprocket spokes, connect a radially inner hub region, which transmits torque from the sprocket arrangement to a rear wheel hub, to a radially outer toothed rim region, which transmits force between a bicycle chain and the sprocket arrangement.

3. A bicycle rear wheel sprocket arrangement according to claim 1, wherein the first partial arrangement includes the largest sprocket and a second largest sprocket, which are formed integrally with each other.

4. A bicycle rear wheel sprocket arrangement which is rotatable about a common sprocket rotation axis that defines an axial direction and orthogonal to which are radial directions, comprising:
   a plurality of sprockets of different sizes and number of teeth arranged coaxially along the sprocket rotation axis, which are connected to one another such that the sprockets jointly rotate about the sprocket rotation axis together,
   wherein the sprocket arrangement comprises:
      a first partial arrangement that includes a largest sprocket, and
      a second partial arrangement that includes a plurality of sprockets formed integrally with one another,
   wherein the second partial arrangement includes between 6 and 12 axially consecutive sprockets formed integrally with one another,
   wherein at least one pair of adjacent sprockets of the second partial arrangement are connected by integrally formed webs such that there are fewer webs than there are teeth on a smaller sprocket of the at least one pair of adjacent sprockets,
   wherein each sprocket of the at least one pair of adjacent sprockets has an even number of teeth of circumferentially alternating axially thicker and thinner teeth, and
   wherein the webs circumferentially align with the axially thicker teeth of the smaller sprocket.

5. A bicycle rear wheel sprocket arrangement according to claim 4, wherein the sprocket arrangement includes between eight and fourteen sprockets,
   wherein the smallest sprocket has no more than twelve teeth and the largest sprocket has no fewer than fifty teeth.

6. A bicycle rear wheel sprocket arrangement according to claim 4, wherein a plurality of sprockets with an even number of teeth have circumferentially alternating axially thicker teeth and axially thinner teeth.

7. A bicycle rear wheel sprocket arrangement according to claim 4, wherein the smallest sprocket has circumferentially alternating axially thicker and thinner teeth along at least part of the circumference of the sprocket,
   wherein lateral tooth flanks on an axially inboard side of the axially thicker and the axially thinner teeth are configured along a common virtual enveloping surface,
   wherein starting from the common enveloping surface, the axially thicker teeth extend axially further outboard than the axially thinner teeth.

8. A bicycle rear wheel sprocket arrangement which is rotatable about a common sprocket rotation axis that defines an axial direction and orthogonal to which are radial directions, comprising:
   a plurality of sprockets of different sizes and number of teeth arranged coaxially along the sprocket rotation axis, which are connected to one another such that the sprockets jointly rotate about the sprocket rotation axis together,
   wherein the sprocket arrangement comprises:
      a first partial arrangement that includes a largest sprocket, and
      a second partial arrangement that includes a plurality of sprockets formed integrally with one another,
   wherein a smallest sprocket has circumferentially alternating axially thicker and thinner teeth along at least part of a circumference of the sprocket,
   wherein lateral tooth flanks on an axially inboard side of the axially thicker and the axially thinner teeth are configured along a common virtual enveloping surface,
   wherein starting from the common enveloping surface, the axially thicker teeth extend axially further outboard than the axially thinner teeth.

9. A bicycle rear wheel sprocket arrangement according to claim 8, wherein for a plurality of the axially thicker teeth of the smallest sprocket, the axially inboard lateral tooth flank is circumferentially wider than a flank on an axially outboard side of the tooth such that both circumferential edges of the inboard lateral tooth flank extend circumferentially beyond circumferential edges of the outboard flank.

10. A bicycle rear wheel sprocket arrangement according to claim 9, wherein at least one of the axially thicker teeth includes at least one step from the circumferentially wider inboard tooth flank to the circumferentially narrower outboard tooth flank on at least one circumferential side of the tooth.

* * * * *